US012058096B2

(12) United States Patent
Yang et al.

(10) Patent No.: US 12,058,096 B2
(45) Date of Patent: Aug. 6, 2024

(54) METHOD AND APPARATUS FOR ESTABLISHING END-TO-END NETWORK CONNECTION, AND NETWORK SYSTEM

(71) Applicant: Huawei Technologies Co., Ltd., Shenzhen (CN)

(72) Inventors: Renzhi Yang, Shanghai (CN); Bin Wang, Shanghai (CN); Teng Zhang, Shanghai (CN); Li Zhou, Shenzhen (CN); Yanming Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/618,123

(22) PCT Filed: Jun. 9, 2020

(86) PCT No.: PCT/CN2020/095045
§ 371 (c)(1),
(2) Date: Dec. 10, 2021

(87) PCT Pub. No.: WO2020/248963
PCT Pub. Date: Dec. 17, 2020

(65) Prior Publication Data
US 2022/0286425 A1    Sep. 8, 2022

(30) Foreign Application Priority Data
Jun. 11, 2019 (CN) .......................... 201910501933.1

(51) Int. Cl.
*H04L 61/2575* (2022.01)
*H04L 45/00* (2022.01)
(Continued)

(52) U.S. Cl.
CPC .......... *H04L 61/2575* (2013.01); *H04L 45/72* (2013.01); *H04L 61/2514* (2013.01);
(Continued)

(58) Field of Classification Search
CPC . H04L 45/72; H04L 61/2514; H04L 61/2517; H04L 61/2553; H04L 61/256;
(Continued)

(56) References Cited

U.S. PATENT DOCUMENTS 11,238,855 B1 *    2/2022   Goetz .................... G10L 13/00
2003/0145106 A1    7/2003   Brown
(Continued)

FOREIGN PATENT DOCUMENTS

CN          1863157 A      11/2006
CN        101083565 A      12/2007
(Continued)

OTHER PUBLICATIONS

Baset, Salman A., and Henning Schulzrinne, ("An analysis of the skype peer-to-peer internet telephony protocol." arXiv preprint cs/0412017 (Year: 2004).*

(Continued)

*Primary Examiner* — Thomas J Dailey
(74) *Attorney, Agent, or Firm* — Conley Rose, P.C.

(57) ABSTRACT

A method for establishing an end-to-end network connection includes obtaining, by a first node, super node information from a server, obtaining, by the first node, a network address translation (NAT) type of the first node, obtaining, by the first node, a NAT type of a to-be-connected second node from the server, determining, by the first node based on the NAT type of the first node and the NAT type of the second node, whether to use a relay node, and selecting, by the first node, the relay node from super nodes to establish a connection to the second node.

20 Claims, 12 Drawing Sheets

(51) Int. Cl.
*H04L 61/2514* (2022.01)
*H04L 61/2517* (2022.01)
*H04L 61/2553* (2022.01)
*H04L 61/256* (2022.01)
*H04L 61/2589* (2022.01)
*H04L 67/141* (2022.01)
*H04W 40/12* (2009.01)
*H04W 40/22* (2009.01)

(52) U.S. Cl.
CPC ...... *H04L 61/2517* (2013.01); *H04L 61/2553* (2013.01); *H04L 61/256* (2013.01); *H04L 61/2589* (2013.01); *H04L 67/141* (2013.01); *H04W 40/12* (2013.01); *H04W 40/22* (2013.01)

(58) Field of Classification Search
CPC ............. H04L 61/2575; H04L 61/2589; H04L 67/141; H04W 40/12; H04W 40/22
See application file for complete search history.

(56) References Cited

U.S. PATENT DOCUMENTS

| | | | | |
|---|---|---|---|---|
| 2006/0242227 | A1* | 10/2006 | Rao | H04L 61/4541 709/203 |
| 2009/0323632 | A1* | 12/2009 | Nix | H04W 36/0033 370/331 |
| 2011/0314181 | A1* | 12/2011 | Guo | H04L 61/2575 709/245 |
| 2014/0258883 | A1 | 9/2014 | Duarte et al. | |
| 2016/0380967 | A1* | 12/2016 | Moore | H04L 61/2589 709/217 |

FOREIGN PATENT DOCUMENTS

| | | |
|---|---|---|
| CN | 101217536 A | 7/2008 |
| CN | 101282302 A | 10/2008 |
| CN | 103139349 A | 6/2013 |
| CN | 104584488 A | 4/2015 |
| CN | 105610999 A | 5/2016 |
| CN | 109495599 A | 3/2019 |
| CN | 109660637 A | 4/2019 |
| CN | 109831547 A | 5/2019 |
| CN | 110266828 A | 9/2019 |
| EP | 3413520 A1 | 12/2018 |
| WO | 2004073281 A2 | 8/2004 |

OTHER PUBLICATIONS

Shanshan, J., et al., "Research and Realization of NAT Traversal Solutions in VoIP System Based on SIP Protocol," Beijing University of Posts and Telecommunications, Mar. 2010, 11 pages. (revelant part and translation).

ITU-T H.323 , Telecommunication Standardization Sectorof ITU , Amendment 1, Mar. 2013, "Series H: Audiovisual and Multimedia Systems Infrastructure of audiovisual services, Systems and terminal equipment for audiovisual services, Packet-based multimedia communications systems, Amendment 1: Use of Facility message to enable call transfer," 8 pages.

Rekhter, Y., et al., "Address Allocation for Private Internets," RFC 1918, Feb. 1996, 9 pages.

Rosenberg, J., et al., "STUN—Simple Traversal of User Datagram Protocol (UDP) Through Network Address Translators (NATs)," RFC 3489, Mar. 2003, 48 pages.

Rosenberg, J., "Interactive Connectivity Establishment (ICE): A Protocol for Network Address Translator (NAT) Traversal for Offer/Answer Protocols," RFC 5245, Apr. 2010, 117 pages.

Baset, S., et al., "An Analysis of the Skype Peer-to-Peer Internet Telephony Protocol," 25th IEEE International Conference on Computer Communicationsproceedings, IEEE, Piscataway, NJ, Apr. 1, 2006, 11 pages.

Porter Thomas, et al., "How to Cheat at VoIP Security—Chapter 11-Skype Firewall and Network Setup," Syngress Media, Rockland, MA, ISBN:978-1-59749-169-3, Jun. 28, 2007, 22 pages.

* cited by examiner

METHOD AND APPARATUS FOR ESTABLISHING END-TO-END NETWORK CONNECTION, AND NETWORK SYSTEM

CROSS-REFERENCE TO RELATED APPLICATIONS

This application is a U.S. National Stage of International Patent Application No. PCT/CN2020/095045 filed on Jun. 9, 2020, which claims priority to Chinese Patent Application No. 201910501933.1 filed on Jun. 11, 2019. Both of the aforementioned applications are hereby incorporated by reference in their entireties.

TECHNICAL FIELD

This application relates to the field of Internet technologies, and in particular, to a method and an apparatus for establishing an end-to-end network connection, and a network system.

BACKGROUND

With development of related technologies, such as Internet technologies, intelligent hardware technologies, and Internet of things technologies, a quantity of terminal devices accessing the Internet is rapidly increasing. It is predicted that more than 25 billion terminal devices will be online on the Internet by 2020. In an ideal case, for ease of interconnection between terminal devices, each terminal device may have its own public Internet protocol (internet protocol, IP) address. However, as a quantity of online devices increases, a quantity of public IP addresses that can be allocated is seriously insufficient under the Internet protocol version 4 (internet protocol version 4, IPv4) that is widely adopted at present.

To resolve a problem of acute shortage of public IP addresses, a network address translation (network address translation, NAT) technology is introduced into the Internet. NAT is a technology for rewriting a source IP address or destination IP address of a data packet when the data packet passes through a router or a firewall. Specifically, a plurality of network devices are placed in a private internal-network environment by using a NAT device, an internal IP address is allocated to each device in the internal-network environment based on an internal IP address space defined in the protocol "Request for Comments (request for comments, RFC) 1918: Address Allocation for Private Internets (address allocation for private internets)" released by the Internet Engineering Task Force (internet engineering task force, IETF), and the internal IP address is mapped to an external IP address, so that the network devices located in the internal-network environment access the Internet by using a same public IP address. In this way, the problem of IPv4 address shortage is resolved.

While resolving the problem of IPv4 address shortage, the NAT technology brings about a problem that a connection between network devices is limited. Based on NAT restriction conditions on a network connection, NAT may be classified into full cone NAT (full cone NAT), restricted cone NAT (address restricted cone NAT), port restricted cone NAT (Port Restricted cone NAT), and symmetric NAT (Symmetric NAT). The other three types of NAT than full cone NAT allow only proactive connection initiation to the outside by an internal-network device, but accept no proactive connection from the outside. Therefore, when no connection is established, a connection request from an external device is rejected by a NAT device, and as a result, an internal-network device cannot establish a connection to the external device.

For a purpose of resolving a network device connection problem under any NAT type, a NAT traversal (NAT traversal) technology is widely applied. Current NAT traversal is mostly based on the STUN (session traversal utilities for NAT, session traversal utilities for NAT) protocol and/or TURN (traversal using relay NAT) protocol, and a connection between network devices in a NAT environment is processed by using a relay server, where the network devices acting as two parties of data exchange need to separately establish connections to the relay server and send data to the relay server, so that the relay server forwards the data to the network devices that are the two parties. In the foregoing NAT traversal technology, quality of the connection between the network devices fluctuates due to impact of factors such as performance and load of the relay server and a network environment, and moreover, relay server maintenance usually requires high bandwidth costs.

SUMMARY

Embodiments of this application provide a method and an apparatus for establishing an end-to-end network connection, and a network system, so that a terminal device in any network environment can establish a network connection and transmit data without using a relay server for data forwarding.

According to a first aspect, an embodiment of this application provides a method for establishing an end-to-end network connection. The method includes: A first node obtains super node information from a server, where a super node is a node that is determined by the server and whose network address translation NAT type is cone NAT, or a node that has a public Internet protocol IP address; the first node sends a data packet to the super node, and determines a NAT type of the first node based on a data packet returned by the super node; the first node obtains a NAT type of a to-be-connected second node from the server; the first node determines, based on the NAT type of the first node and the NAT type of the second node, whether to use a relay node; and when the first node determines to use the relay node, the first node selects a node from the super node as the relay node, and establishes a connection to the second node by using the relay node.

According to the method provided in this embodiment of this application, the first node obtains the super node information from the server then obtains the NAT type of the first node by using the super node, and obtains the NAT type of the to-be-connected second node from the server; and then determines, based on the NAT type of the first node and the NAT type of the second node, whether to use the relay node, and selects, when the relay node needs to be used, the relay node from the super node to establish the connection to the second node. Therefore, according to the method, a terminal device in any network environment can establish a network connection and transmit data without using a server for data forwarding, so that there is no need to maintain a server for data forwarding. This avoids costs such as extra bandwidth required for server maintenance. In addition, because any terminal device whose NAT type meets a requirement may be used as a super node, a large quantity of super nodes may be distributed in a network system and perform a data relay function. In this way, super-node network resources are fully utilized, and network resource utilization is improved.

In an optional implementation, the first node sends data packets to at least two super nodes, and the first node determines the NAT type of the first node based on whether a data packet returned by the super node is received and a parameter of the data packet returned by the super node. In this way, the first node can determine the NAT type of the first node without relying on the server, to provide a basis for determining whether to use the relay node for connecting to the second node.

In an optional implementation, the first node selects a first super node and a second super node from the super nodes; the first node sends a first data packet to the first super node, so that the first super node obtains a source IP address and source port of the first data packet, and indicates the second super node to send a second data packet to the source IP address and source port of the first data packet; and if the first node receives the second data packet, the first node determines that the NAT type of the first node is full cone NAT. In this way, by using the first super node and the second super node, the first node can determine whether the NAT type of the first node is full cone NAT.

In an optional implementation, if the first node does not receive the second data packet, the first node sends a third data packet to the second super node, so that the second super node obtains a source IP address and source port of the third data packet, and analyzes whether the source port of the first data packet is the same as the source port of the third data packet; and if the source port of the first data packet is different from the source port of the third data packet, the first node determines that the NAT type of the first node is symmetric NAT. In this way, when determining that the NAT type of the first node is not full cone NAT, the first node further determines, by using the second super node, whether the NAT type of the first node is symmetric NAT.

In an optional implementation, if the source port of the first data packet is the same as the source port of the third data packet, the first node analyzes whether a fourth data packet is received, where the fourth data packet is sent by the second super node to the source IP address and source port of the third data packet, and a public port used by the second super node to send the fourth data packet is different from a destination port of the third data packet; and if the first node receives the fourth data packet, the first node determines that the NAT type of the first node is restricted cone NAT; or if the first node does not receive the fourth data packet, the first node determines that the NAT type of the first node is port restricted cone NAT. In this way, when determining that the NAT type of the first node is not full cone NAT or symmetric NAT, the first node can further determine, by using the second super node, whether the NAT type of the first node is restricted cone NAT or port restricted cone NAT.

In an optional implementation, the first node obtains link quality of each super node, and selects the first super node and the second super node based on the link quality. In this way, it is ensured that low-latency and stable communication is formed between the first node and the first super node and the second super node, and a speed and accuracy of determining the NAT type of the first node by the first node are increased.

In an optional implementation, the first node determines whether the super node information includes historically selected super nodes, and if the super node information includes the historically selected super nodes, selects the first super node and the second super node from the historically selected super nodes. In this way, the first node can select the first super node and the second super node without obtaining link quality of each super node, thereby increasing a selection speed.

In an optional implementation, the first node obtains online node information from the server; the first node determines a node identity (identity, ID) of the second node from the online node information according to a user instruction; the first node sends, to the server, a query instruction that carries the node ID of the second node; and the first node receives the NAT type that is of the second node and that is obtained by the server through querying based on the node ID of the second node. In this way, the first node obtains the NAT type of the second node from the server, to provide a basis for determining whether to use the relay node to establish the connection to the second node.

In an optional implementation, when the NAT types/type of the first node and/or the second node are/is full cone NAT, or when the first node and/or the second node have/has public IP addresses/a public IP address, the first node determines that the relay node does not need to be used. Therefore, by using a characteristic that a node with full cone NAT and a node having a public IP address can be accessed by any node, when the NAT type of either of the first node and the second node is full cone NAT or either of the first node and the second node has a public IP address, the first node can be directly connected to the second node, so that no relay node needs to be used.

In an optional implementation, when the NAT types of the first node and the second node are restricted cone NAT or port restricted cone NAT, or when the NAT type of one of the first node and the second node is symmetric NAT and the NAT type of the other node is restricted cone NAT, the first node determines to use the relay node, where the relay node is used by the first node and the second node to perform UDP (user datagram protocol, user datagram protocol) hole punching (holepunch).

In an optional implementation, when the NAT type of one of the first node and the second node is symmetric NAT and the NAT type of the other node is port restricted cone NAT, the first node determines to use the relay node, where the relay node is used by the first node and the second node to perform port prediction.

In an optional implementation, when the NAT types of the first node and the second node are both symmetric NAT, the first node determines to use the relay node, where the relay node is used for data forwarding between the first node and the second node.

In an optional implementation, the first node obtains link quality of each super node, and selects the relay node from the super node based on the link quality. In this way, it is ensured that low-latency and stable communication is formed between the relay node and the first node and the second node through data forwarding by the relay node.

In an optional implementation, the first node, the second node, and the super node include terminal devices located on a wide area network (wide area network, WAN) and/or a local area network (local area network, LAN).

In an optional implementation, the server is located on a wide area network WAN and/or a local area network LAN; and the server has a public IP address, or a NAT type of the server is cone NAT. In this way, it is ensured that any terminal device can proactively access the server and establish a connection to the server.

In an optional implementation, the first node performs instant messaging instant messaging, IM) with the second node by using the relay node, where the instant messaging includes at least one of the following forms: voice communication, video communication, image transmission, text transmission, and/or file transmission.

According to a second aspect, an embodiment of this application further provides an apparatus for establishing an end-to-end network connection. The apparatus includes a transceiver, a memory, and a processor. The memory includes program instructions. When the program instructions are run by the processor, the apparatus is enabled to be configured to perform the following steps: obtaining super node information from a server, where a super node is a node that is determined by the server and whose network address translation (network address translation, NAT) type is cone NAT, or a node that has a public Internet protocol (internet protocol, IP) address; sending a data packet to the super node, and determining a NAT type of the apparatus based on a data packet returned by the super node; obtaining a NAT type of a to-be-connected second node from the server; determining, based on the NAT type of the apparatus and the NAT type of the second node, whether to use a relay node; and when determining to use the relay node, selecting a node from the super node as the relay node, and establishing a connection to the second node by using the relay node.

The apparatus provided in this embodiment of this application is configured to: obtain, from the server, the super node information that includes the super node; then obtain the NAT type of the apparatus by using the super node, and obtain the NAT type of the to-be-connected second node from the server; and then determine, based on the NAT type of the apparatus and the NAT type of the second node, whether to use the relay node, and select, when the relay node needs to be used, the relay node from the super node to establish the connection to the second node. Therefore, according to the method, a terminal device in any network environment can establish a network connection and transmit data without using a server for data forwarding, so that there is no need to maintain a server for data forwarding. This avoids costs such as extra bandwidth required for server maintenance. In addition, because any terminal device whose NAT type meets a requirement may be used as a super node, a large quantity of super nodes may be distributed in a network system and perform a data relay function. In this way, super-node network resources are fully utilized, and network resource utilization is improved.

Further, the apparatus provided in this embodiment of this application may further perform other implementations of the first aspect.

According to a third aspect, an embodiment of this application further provides a network system. The network system includes nodes and a server. The server is configured to send super node information to a first node, where a super node is a node that is determined by the server and whose NAT type is cone NAT, or a node that has a public IP address. The first node is configured to send a data packet to the super node, and determine a NAT type of the first node based on a data packet returned by the super node. The server is further configured to send a NAT type of a second node to the first node in response to a request of the first node, where the second node is a to-be-connected node selected by the first node. The first node is further configured to determine, based on the NAT type of the first node and the NAT type of the second node, whether to use a relay node. The first node is further configured to: when determining to use the relay node, select a node from the super node as the relay node, and establish a connection to the second node by using the relay node.

In the system provided in this embodiment of this application, the first node obtains, from the server, the super node information that includes the super node; then obtains the NAT type of the first node by using the super node, and obtains the NAT type of the to-be-connected second node from the server; and then determines, based on the NAT type of the first node and the NAT type of the second node, whether to use the relay node, and selects, when the relay node needs to be used, the relay node from the super node to establish the connection to the second node. Therefore, according to the method, a terminal device in any network environment can establish a network connection and transmit data without using a server for data forwarding, so that there is no need to maintain a server for data forwarding. This avoids costs such as extra bandwidth required for server maintenance. In addition, because any terminal device whose NAT type meets a requirement may be used as a super node, a large quantity of super nodes May be distributed in the network system and perform a data relay function. In this way, super-node network resources are fully utilized, and network resource utilization is improved.

Further, the first node in the system provided in this embodiment of this application may further perform other implementations of the first aspect.

According to a fourth aspect, an embodiment of this application further provides a computer readable storage medium. The computer readable storage medium stores instructions. When the instructions are run on a computer, the computer is enabled to perform the method according to the foregoing aspects.

According to a fifth aspect, an embodiment of this application further provides a computer program product that includes instructions. When the computer program product is run on a computer, the computer is enabled to perform the method according to the foregoing aspects.

According to a sixth aspect, an embodiment of this application further provides a chip system. The chip system includes a processor, configured to support the foregoing apparatus or system in implementing a function in the foregoing aspects, for example, generating or processing information in the foregoing method.

DESCRIPTION OF EMBODIMENTS

Figure 1:
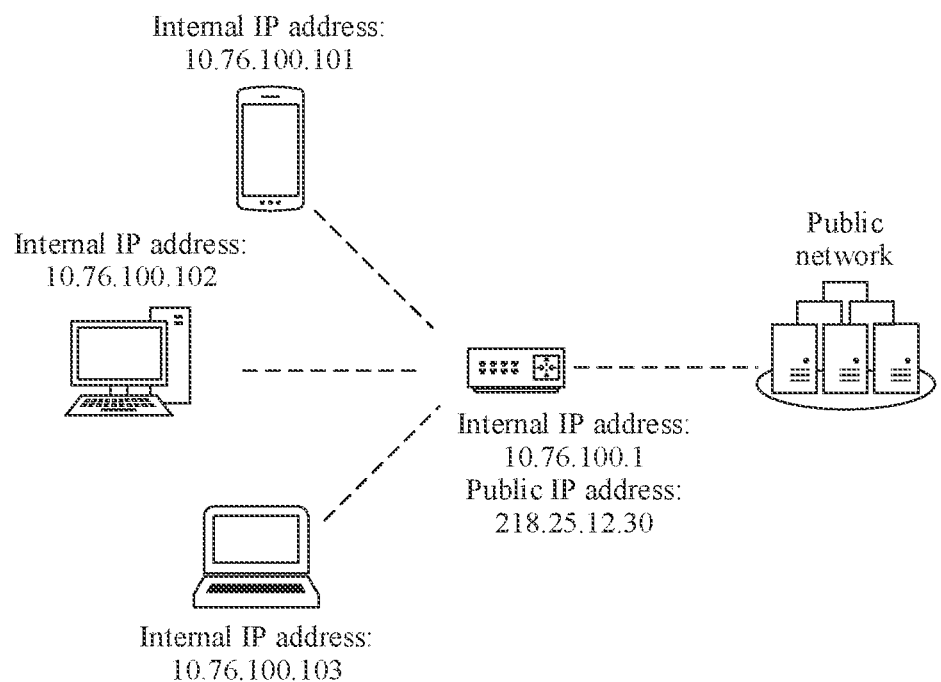
FIG. 1 shows a typical NAT application scenario.

The following clearly describes the technical solutions in the embodiments of this application with reference to the accompanying drawings in the embodiments of this application. In descriptions of the embodiments of this application, "/" means "or" unless otherwise specified. For example, A/B may represent A or B. In the embodiments of this application, "and/or" means only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more.

Before the technical solutions in the embodiments of this application are described, a technical background and an application scenario related to the technical solutions in the embodiments of this application are first specifically described.

Internet protocol IP addresses may include a public address and an internal address. A public address is a unique IP address on the Internet (Internet), for example, an IP address on a wide area network (wide area network, WAN). A public address can be routed on a public network. An internal address is an IP address on an internal network, for example, a local area network (local area network, LAN). An internal address cannot be routed on a public network. According to the protocol "RFC 1918: Address Allocation for Private Internets", internal IP addresses may include three Internet protocol version 4 (internet protocol version 4, IPv4) address spaces of different ranges. The three address spaces are used for intranets or dedicated internal networks of different sizes, and are as follows:

10.0.0.0-10.255.255.255, including approximately 16.77 million IP addresses in total;
172.16.0.0-172.31.255.255, including approximately 1.04 million IP addresses in total; and
92.168.0.0-192.168.255.255, including approximately 65536 IP addresses in total.

A quantity of network devices on an internal network is usually limited. Therefore, in IPv4 and RFC 1918, a quantity of internal IP addresses can meet a use requirement. However, for a public network, because a quantity of network devices accessing the Internet is increasing, acute shortage and even exhaustion of IP addresses in the IPv4 protocol are occurring. To resolve a problem of acute shortage of IPv4 addresses, currently, a network address translation (network address translation, NAT) technology is introduced into the Internet. NAT is a technology for rewriting a source IP address or destination IP address of a data packet when the data packet passes through a NAT device (a router or a firewall). Specifically, a plurality of network devices are placed in a private internal-network environment by using a NAT device, an internal IP address is allocated to each device in the internal-network environment based on an internal IP address space defined in the protocol "RFC 1918: Address Allocation for Private Interacts (address allocation for private interacts)", and the internal IP address is mapped to an external IP address, so that the network devices located in the internal-network environment access the Internet by using a same public IP address. In this way, the problem of IPv4 address shortage is resolved.

FIG. 1 shows a typical NAT application scenario. As shown in FIG. 1, in a typical configuration, a dedicated network includes a dedicated internal network with an internal address space (for example, 192.168.x.x or 10.x.x.x), and a router (serving as a NAT device) connected to the internal network. The router occupies an internal address (for example, 10.76.100.1) in the network address space, and is also connected to a public network by using a public IP address provided by one or more Internet service providers (internet service provider, ISP). When a data packet is transferred from the internal network to the public network, a source address (a source IP address and a source port) of the data packet is converted from an internal address (an internal IP address and an internal port) to a public address (a public IP address and a public port). In addition, the router traces a destination address (a destination IP address and a destination port) on each connection. When a data packet is returned to the router, the router determines, by using connection tracing data recorded at an output stage, which network device on the internal network the data packet should be forwarded to.

While resolving the problem of IPv4 address shortage, the NAT technology brings about a problem that a connection between network devices is limited. Based on NAT restriction conditions on a network connection, NAT may be classified into full cone NAT (full cone NAT), restricted cone NAT (address restricted cone NAT), port restricted cone NAT (Port Restricted cone NAT), and symmetric NAT (Symmetric NAT). The following specifically describes the foregoing four NAT types with reference to accompanying drawings.

Figure 2:
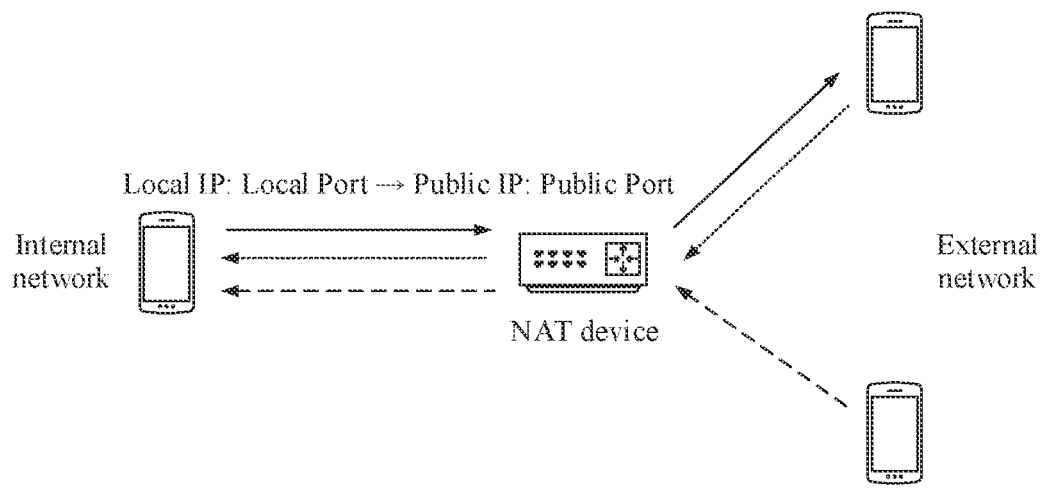
FIG. 2 is a schematic diagram of full cone NAT.

FIG. 2 is a schematic diagram of full cone NAT. As shown in FIG. 2, when a network socket (socket) (Local IP: Local Port (internal IP address: internal port)) is established in an internal-network host, and the internal-network host sends a data packet to an external host for the first time by using the socket, a NAT device allocates a (Public IP: Public Port (public IP address: public port)) to the internal-network host. The (Public IP: Public Port) is used for a data packet that is subsequently sent by the internal-network host to any external host by using the socket. In addition, any external host may send a data packet to the internal-network host by using the (Public IP: Public Port).

Figure 3:
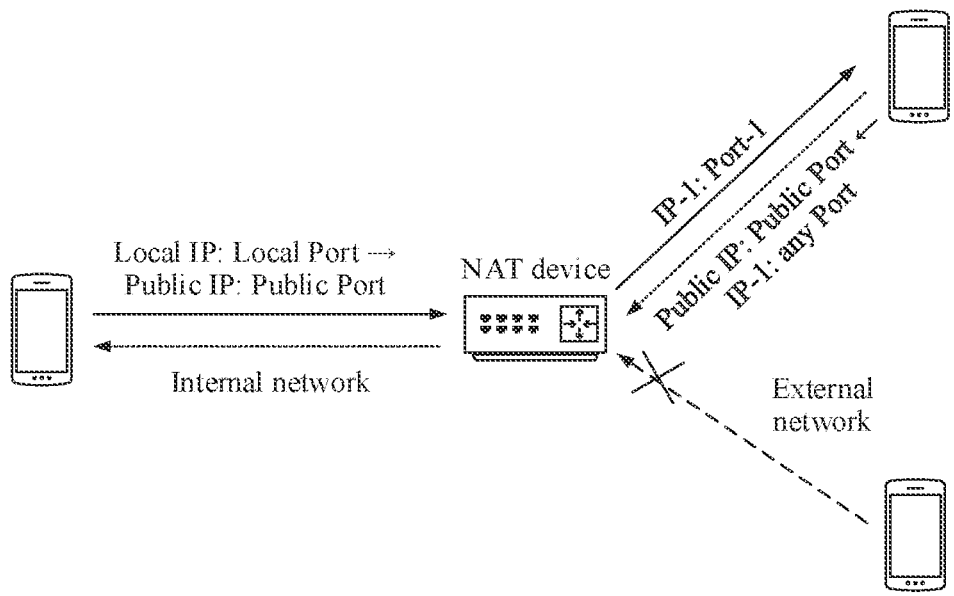
FIG. 3 is a schematic diagram of restricted cone NAT.

FIG. 3 is a schematic diagram of restricted cone NAT. As shown in FIG. 3, when a network socket (socket) (Local IP: Local Port) is established in an internal-network host, and the internal-network host sends a data packet to an external host for the first time by using the socket, a NAT device allocates a (Public IP: Public Port) to the internal-network host. The (Public IP: Public Port is used for a data packet that is subsequently sent by the internal-network host to any external host by using the socket. In addition, for an external-network host to send a data packet to the internal-network host, two conditions need to be met: The internal-network host has sent a data packet to an external-network host (IP-1: Port-1) by using the socket; the external-network host sends the data packet to the (Public IP: Public Port) by using (IP-1: any Port). If the two conditions are not met, the internal-network host cannot receive the data packet from the external-network host.

Figure 4:
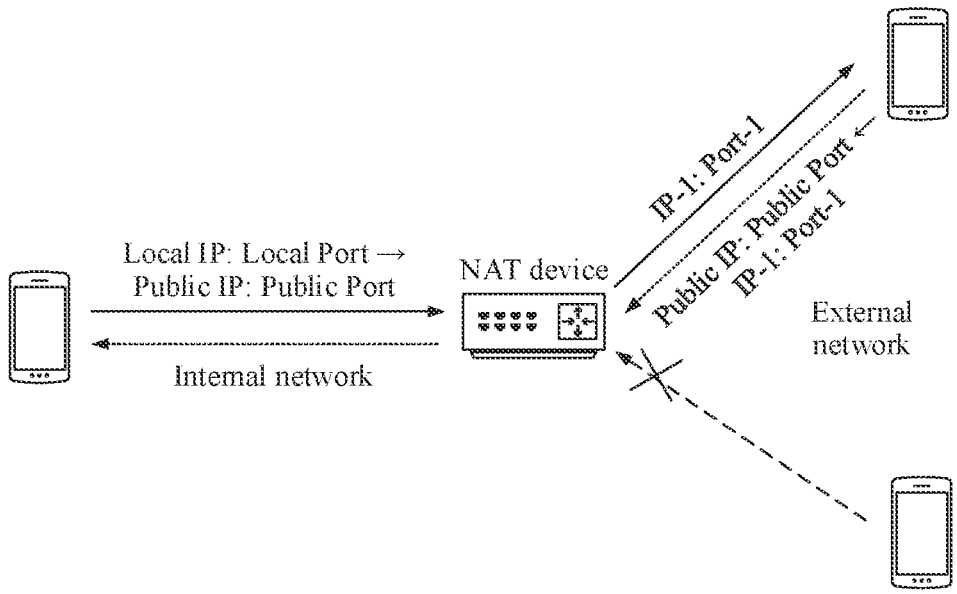
FIG. 4 is a schematic diagram of port restricted cone NAT.

FIG. 4 is a schematic diagram of port restricted cone NAT. As shown in FIG. 4, when a network socket (socket) (Local IP: Local Port) is established in an internal-network host, and the internal-network host sends a data packet to an external host for the first time by using the socket, a NAT device allocates a (Public IP: Public Port) to the internal-network host. The (Public IP: Public Port is used for a data packet that is subsequently sent by the internal-network host to any external host by using the socket. In addition, for an external-network host to send a data packet to the internal-network host, two conditions need to be met: The internal-network host has sent a data packet to an external-network host (IP-1: Port-1) by using the socket; the external-network host sends the data packet to the (Public IP: Public Port) by using (IP-1: Port-1). If the two conditions are not met, the internal-network host cannot receive the data packet from the external-network host.

Figure 5:
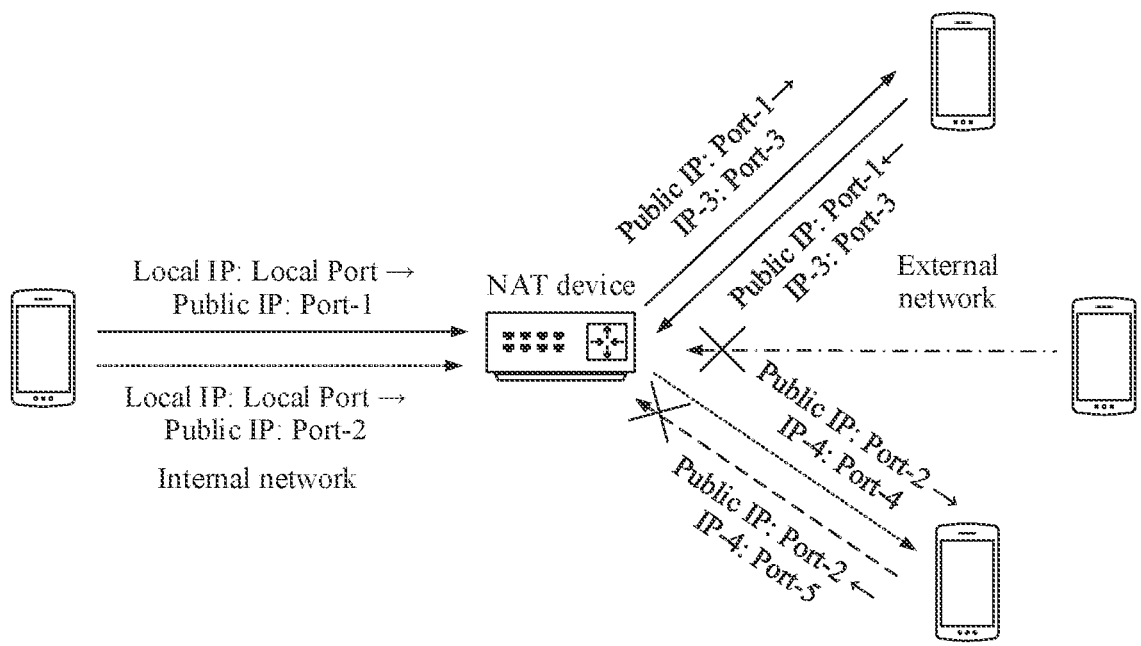
FIG. 5 is a schematic diagram of symmetric NAT.

FIG. 5 is a schematic diagram of symmetric NAT. As shown in FIG. 5, when a network socket (socket) (Local IP: Local Port) is established in an internal-network host, and the internal-network host sends a data packet to an external host 1 for the first time by using the socket, a NAT device allocates a (Public IP-1: Port-1) to the internal-network host. If the internal-network host further sends a data packet to an external host 2 for the first time by using the socket, the NAT device further allocates a (Public IP-2: Port-2) to the internal-network host. If the NAT device has more than one public IP address, the public IP-1 and the public IP-2 may be different. If the NAT device has only one public IP address, the port-1 and the port-2 are definitely different. In addition, if any external host expects to send data to the internal-network host, the external host should first receive data sent by the internal-network host to the external host. Otherwise, the external host cannot send data to the internal-network host even if the external host knows a (Public IP: Port) of the internal-network host.

It can be learned that some NAT types allow only proactive connection initiation to an external host by an internal-network host, but accept no proactive connection from an external host. Therefore, when no connection is established, a connection request from an external device is rejected by a NAT device, and as a result, an internal-network device cannot establish a connection to the external device.

Figure 6:
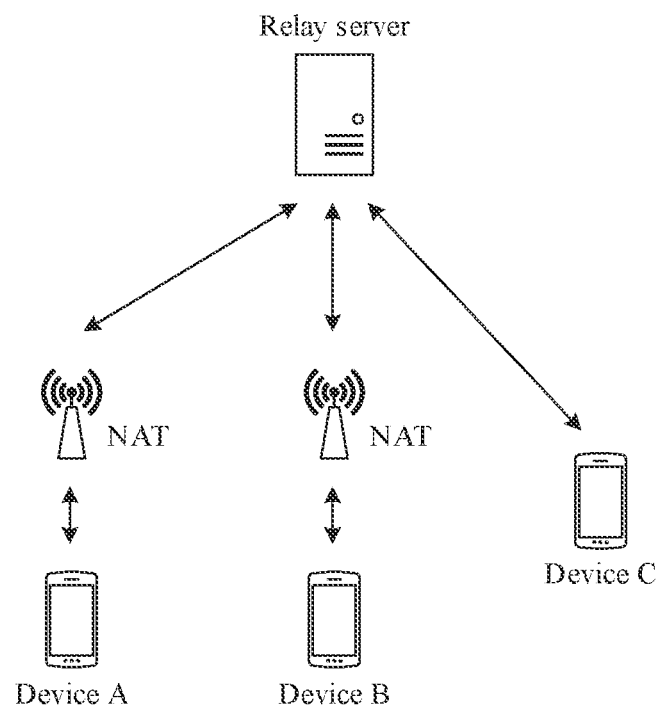
FIG. 6 is a schematic diagram of a current NAT traversal technology.

For a purpose of resolving a network device connection problem under any NAT type, a NAT traversal (NAT traversal) technology is widely applied. FIG. 6 is a schematic diagram of a current NAT traversal technology. As shown in FIG. 6, current NAT traversal is mostly based on the STUN (session traversal utilities for NAT, session traversal utilities for NAT) protocol and/or TURN (traversal using relay NAT) protocol, and a connection between network devices is processed by using a relay server. The relay server is a public server, and uses a well-known public IP address that can be accessed from any place in the world. A network device on an internal network first proactively establishes a connection to the relay server, and maintains the connection. When network devices that are two communication parties perform data exchange, the network device sends a data packet to the relay server, and the relay server is responsible for forwarding the data packet to a network device that is the other party.

For example, as shown in FIG. 6, devices A, B, and C separately establish connections to the relay server. When the device A located on a local area network expects to send a picture to the device B located on another local area network, the device A needs to first send the picture to the relay server. After receiving the picture sent by the device A, the relay server forwards the picture to the device B. When the device C located on a public network expects to send a picture to the device A located on the local area network, the device C also needs to first send the picture to the relay server. After receiving the picture sent by the device C, the relay server forwards the picture to the device A.

It can be learned that, in the current NAT traversal technology, a relay server needs to forward data generated by all devices. This causes high bandwidth overheads, high bandwidth costs, and high relay server maintenance costs. In addition, performance and load of a relay server, a network environment, and the like fluctuate, and therefore, quality of a connection between network devices is also affected.

Figure 7:
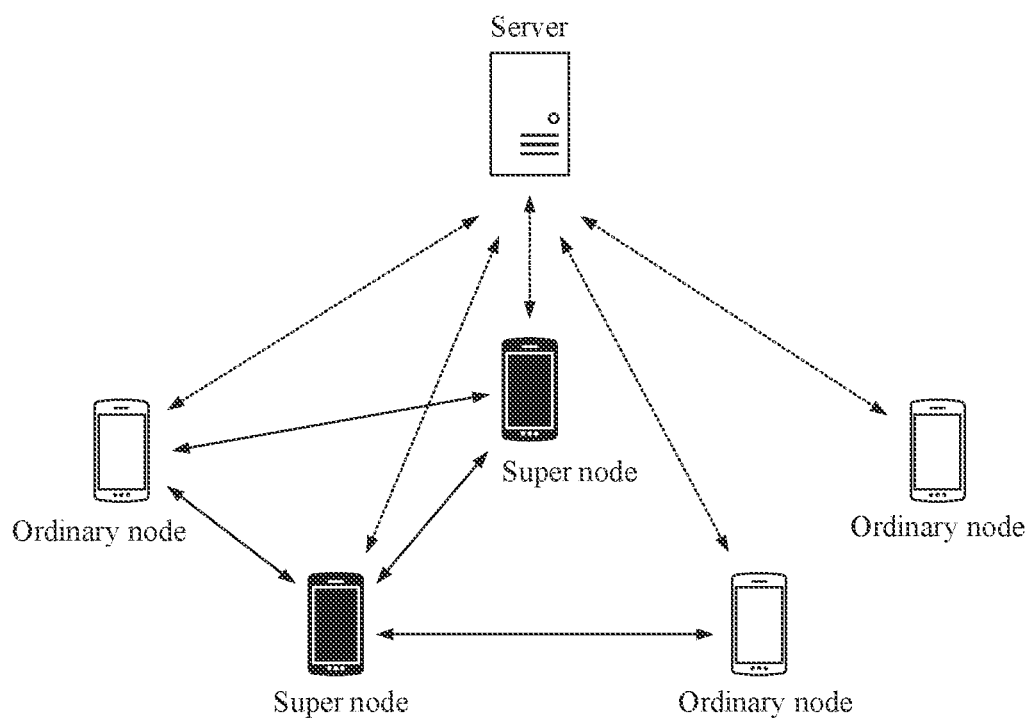
FIG. 7 is a schematic structural diagram of a network system according to an embodiment of this application.
Figure 8:
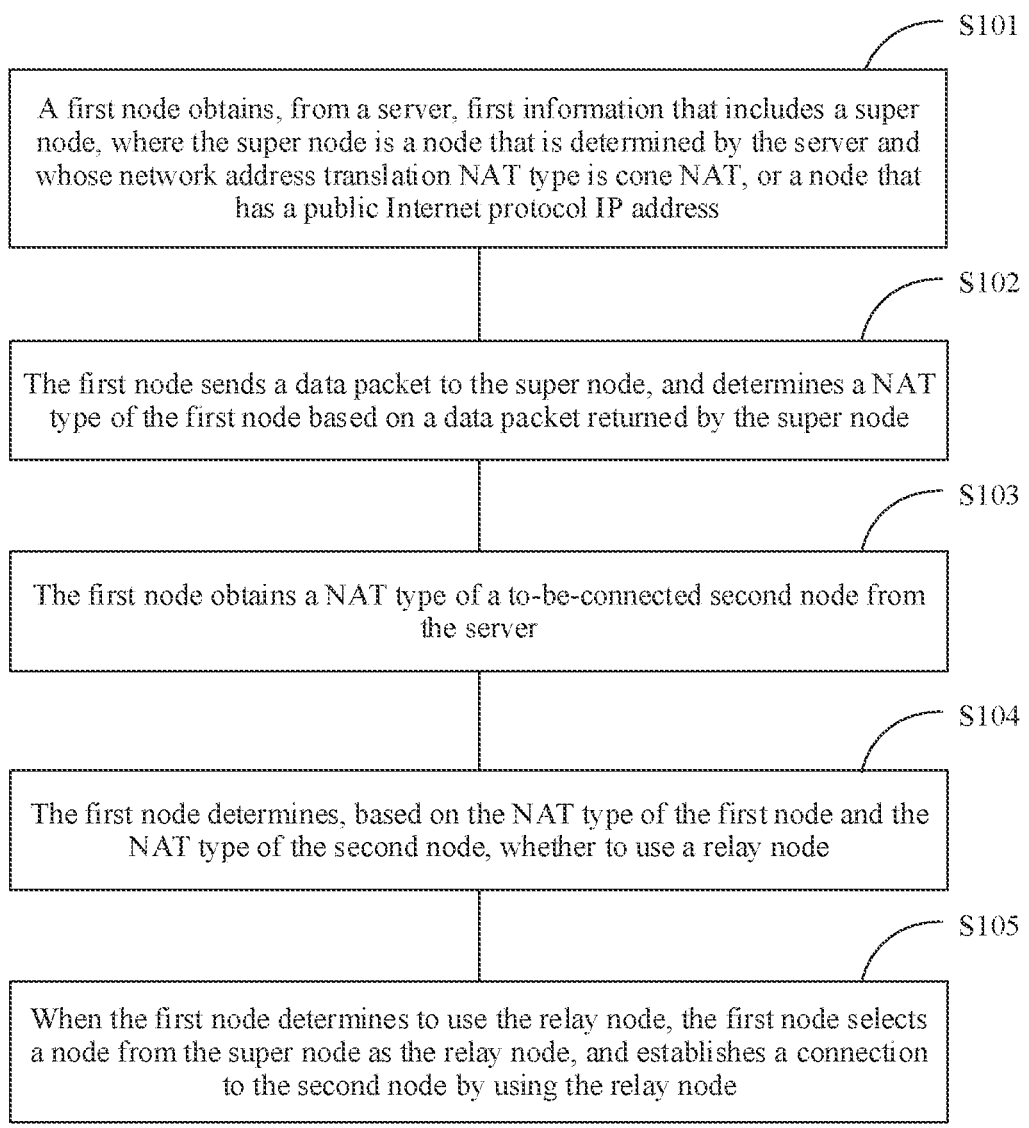
FIG. 8 is a flowchart of a method for establishing an end-to-end network connection according to an embodiment of this application.

An embodiment of this application provides a method for establishing an end-to-end network connection. The method may be applied to a network system shown in FIG. 7. As shown in FIG. 7, the network system includes a server and nodes. A node is referred to as an ordinary node or a super node based on a difference in network functions in the embodiments of this application. An ordinary node and a super node are not essentially different except for different network functions. A node may be an ordinary node, or may be a super node. An ordinary node and a super node may be terminal devices, for example, mobile phones, personal computers, workstations, tablet computers, smart wearable devices, smart household devices, and internet of things devices, located on a wide area network (wide area network, WAN) and/or a local area network (local area network, LAN). A client program may be installed on a node. A user having a specific account can log in to the server by using the account in the client program, so that the node establishes a persistent connection to the server. The server may be located on a wide area network WAN and/or a local area network LAN. In addition, the server should have a public IP address, or a NAT type of the server is cone NAT, so that any terminal device can proactively access the server and establish a connection to the server, FIG. 8 is a flowchart of a method for establishing an end-to-end network connection according to an embodiment of this application. The method is used to establish an end-to-end network connection between two nodes, to implement end-to-end communication, such as instant messaging, for example, voice communication, video communication, image transmission, text transmission, and file transmission, between the two nodes. For ease of description, in this embodiment of this application, the two nodes are referred to as a first node and a second node. The first node is a node that initiates a connection, and the second node is a node that responds to the connection. As shown in FIG. 8, the method may include the following steps.

Step S101: The first node obtains super node information from a server, where a super node is a node that is determined by the server and whose network address translation NAT type is cone NAT, or a node that has a public Internet protocol IP address.

Internet protocol IP addresses may include a public IP address and an internal IP address. A public IP address is a unique IP address on the Internet (Internet), for example, an IP address on a wide area network (wide area network, WAN). A public IP address can be routed on a public network. An internal IP address is an IP address on an internal network, for example, a local area network (local area network, LAN). An internal IP address cannot be routed on a public network.

Specifically, when the first node logs in to the server, the server performs login verification on the first node based on information such as a user account and a public key. If login verification of the first node succeeds, the first node establishes a persistent connection to the server, and the super node information is sent to the first node. The super node information may include information such as a node identity (identity, ID), an IP address (including an IPv4 address and/or IPv6 address), a port (including a public port and an internal port (if there is NAT)), and an online/offline state of the super node. A node ID may be any information used to determine an identity of a node, for example, a node number, a MAC address of the node, a hardware identification code of the node, or a unique identifier (unique identifier, UID) of the node.

In an embodiment, as shown in Table 1, the super node information may be a super node list.

TABLE 1

Super node list

| Node ID | IP address | Port | Online/Offline state |
|---|---|---|---|
| 1 | 116.138.177.20 | 49153 | Online |
| 2 | 139.215.187.111 | 50995 | Online |
| 3 | 2001:DB8:2de::e13 | 60125 | Online |
| 4 | 2001:0DB8::1428:57ab | 54230 | Offline |

In an embodiment, at an early stage of network system establishment, the server may not yet determine the super node from a connected node, or may not yet determine a sufficient quantity of super nodes. In this case, the server may determine the server itself as the super node. When a network system includes a plurality of servers, some of the servers may be determined as the super node.

In an embodiment, if the server determines a plurality of super nodes, the server may choose to send information about only some of the super nodes to the first node. For example, the server sends, based on a geographical location of the first node, information about only a super node near the first node.

In an optional implementation, the server may obtain a public IP address of the first node from a data packet sent by the first node, and determine geographical location information, for example, "located in a city A", of the first node based on the public IP address. Then, the server may select, from the determined super nodes, a super node located in the city A, and send information about the selected super node to the first node.

In an optional implementation, the first node may obtain geographical location information of the first node by using a built-in GPS module or the like, and send the geographical location information of the first node to the server when logging in to the server, so that the server selects, based on the geographical location information of the first node, information about a super node near the first node, and sends the information to the first node.

In an optional implementation, the server may obtain Internet service provider ISP information of the first node based on a public IP address of the first node, then select information about a super node whose ISP is the same as that of the first node, and send the information to the first node. For example, if the server determines, based on the public IP address of the first node, that the ISP of the first node is China Telecom, the server selects information about a super node whose ISP is also China Telecom, and sends the information to the first node.

Therefore, the server sends, to the first node, the information about the super node near the first node or the information about the super node whose ISP is the same as that of the first node. This can ensure a comparatively low connection delay and a stable connection speed between the first node and the super node.

In this embodiment of this application, it is required that the super node be able to receive a connection request that is proactively initiated by another node, and establish a connection to the node that initiates the connection request. Therefore, to meet the foregoing requirement, according to a restriction rule of current NAT types, the super node may be a node whose NAT type is cone NAT, or a node that has a public. IP address. Currently, due to IPv4 address shortage, an ISP usually does not allocate a public IPv4 address to a node. In IPv6, a quantity of IP addresses that can be allocated is enormous, and there is no need for concern about an address shortage problem. Therefore, when an ISP supports IPv6, the ISP usually allocates a unique public IPv6 address to each node, so that such nodes with IPv6 addresses can serve as super nodes.

Step S102: The first node sends a data packet to the super node, and determines a NAT type of the first node based on a data packet returned by the super node.

In an embodiment, the first node may select at least two super nodes to determine the NAT type of the first node. This may specifically include the following: The first node sends data packets to the at least two super nodes. After receiving the data packet, the super node responds and returns a data packet according to a rule. Then, the first node may determine the NAT type of the first node based on whether the data packet returned by the super node is received and a parameter such as a source IP address and source port of the data packet returned by the super node. A specific implementation process in which the first node selects the at least two super nodes to determine the NAT type of the first node in step S102 is further described with reference to FIG. 11 to FIG. 14.

In an embodiment, after logging in to the server each time, each node determines a NAT type of the node based on an obtained super node, and reports the NAT type to the server, so that the server records NAT types of all nodes that have logged in to the server, and updates and maintains super node information based on a NAT type last reported by a node. For example, if a node is not determined as a super node previously, but a NAT type last reported by the node at a moment T0 is full cone NAT, the server may determine the node as a super node at the moment T0; if a node has been determined as a super node, but a NAT type last reported by the node at a moment T1 is symmetric NAT, the server may determine the node as an ordinary node at the moment T1.

Step S103: The first node obtains a NAT type of a to-be-connected second node from the server.

After logging in to the server, the first node may synchronously obtain an online node from the server, and present the online node to a user by using a client. Then, on the client, the user may determine the second node from the online node by performing a selection operation. Then, the first node initiates, to the server based on the second node determined by the user, a request for obtaining the NAT type of the second node. In response to the request of the first node, the server obtains the NAT type of the second node through querying, and returns the NAT type to the first node. Step S103, that is, a specific implementation process in which the first node obtains the NAT type of the to-be-connected second node from the server, is further described with reference to FIG. 15.

Step S104: The first node determines, based on the NAT type of the first node and the NAT type of the second node, whether to use a relay node.

In this embodiment of this application, a NAT type of the relay node is cone NAT, or the relay node has a public Internet protocol (internet protocol, IP) address. The relay node may establish connections to the first node and the second node separately. When the first node and the second node need to establish a connection and perform data communication, the first node and the second node may establish the connection by using the relay node based on the NAT types of the first node and the second node, and may establish an indirect connection through data forwarding by the relay node. When the first node and the second node establish the indirect connection by using the relay node, all data communication between the first node and the second node is delivered through forwarding by the relay node.

Step S105: When the first node determines to use the relay node, the first node selects a node from the super node as the relay node, and establishes a connection to the second node by using the relay node.

Table 2 shows a correspondence between a node NAT type and a connection manner.

TABLE 2

Node NAT types and connection manners

| First node | Second node | | | |
|---|---|---|---|---|
| | Full cone | Restricted cone | Port restricted cone | Symmetric |
| Full cone | Direct connection | Direct connection | Direct connection | Direct connection |
| Restricted cone | Direct connection | Direct connection after traversal | Direct connection after traversal | Direct connection after traversal |
| Port restricted cone | Direct connection | Direct connection after traversal | Direct connection after traversal | Port-prediction direct connection |
| Symmetric | Direct connection | Direct connection after traversal | Port-prediction direct connection | Forwarding by the relay node |

In an embodiment, when the NAT types/type of the first node and/or the second node are/is full cone NAT, or when the first node and/or the second node have/has public IP addresses/a public IP address, the first node and the second node may establish a connection in a "direct connection" manner without using the relay node. Currently, all IPv6 addresses allocated by ISPs to nodes are public IP addresses. Therefore, if the first node and/or the second node have/has IPv6 addresses/an IPv6 address, a connection may be established in the "direct connection" manner without using the relay node.

In an embodiment, when the NAT types of the first node and the second node are restricted cone NAT or port restricted cone NAT, the first node and the second node may establish a connection in a "direct connection after traversal" manner. "Direct connection after traversal" specifically includes the following: The first node and the second node first perform UDP hole punching (UDP holepunch) by using the relay node, and establish a direct connection after hole punching succeeds. When the NAT type of one node is symmetric NAT and the NAT type of the other node is restricted cone NAT, the first node and the second node may also establish a connection in the "direct connection after traversal" manner.

Figure 9:
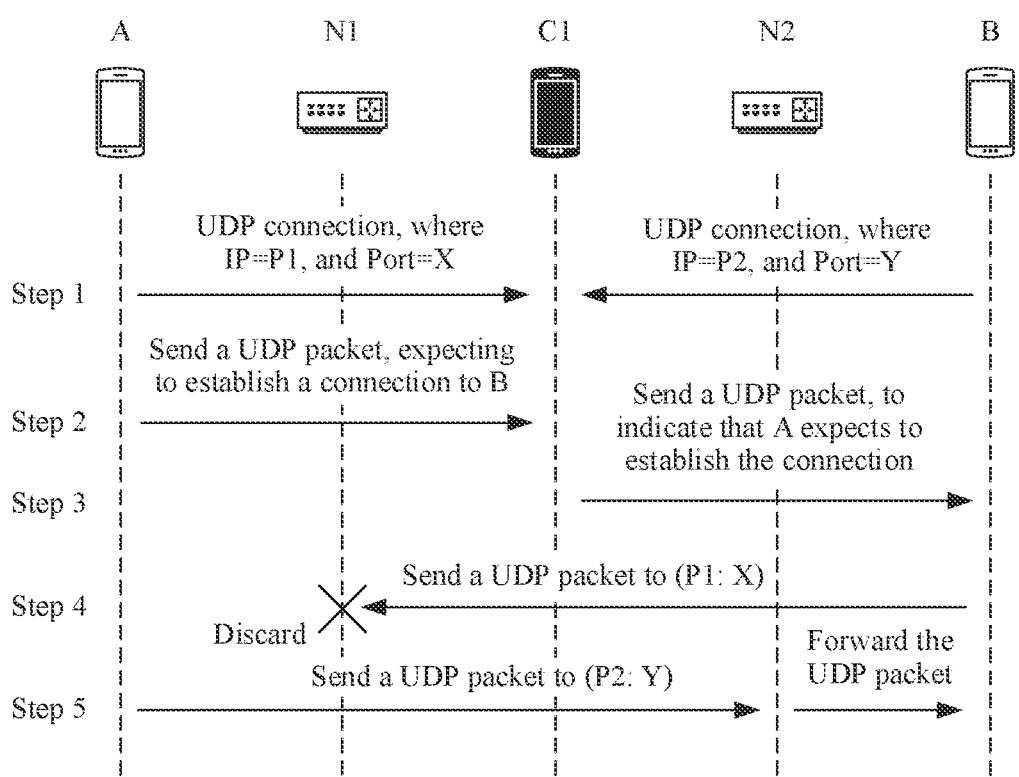
FIG. 9 is a schematic diagram of performing UDP hole punching by using a relay node.

FIG. 9 is a schematic diagram of performing UDP hole punching by using a relay node. As shown in FIG. 9, a first node A is located under a NAT device N1, and a second node B is located under a NAT device N2. The NAT device N1 has a public IP address P1, and the NAT device N2 has a public IP address P2. C1 is the relay node. In this embodiment of this application, performing UDP hole punching by using the relay node, to establish a direct connection between the first node A and the second node B includes the following steps:

Step 1: The first node A and the second node B separately establish UDP connections to the relay node C1, the NAT devices N1 and N2 create UDP translation states, the NAT device N1 allocates a public port X to the first node A, and the NAT device N2 allocates a public port Y to the second node B.

Step 2: The first node A sends a UDP packet to the relay node C1, so as to notify, to the relay node C1, a request of the first node A for establishing a connection to the second node B.

Step 3: The relay node C1 sends a UDP packet to the second node B, so as to notify, to the second node B, the request of the first node A for establishing the connection to the second node B and the public IP address and public port (P1: X) of the first node A.

Step 4: If the second node B accepts the connection request of the first node A, the second node B sends a UDP packet to the public IP address and public port (P1: X) of the first node A. After receiving the UDP packet sent by the second node B, the NAT device N1 discards the UDP packet instead of forwarding the UDP packet to the first node A, because the first node A has not sent a data packet to the second node B previously.

Step 5: The first node A sends a UDP packet to the public IP address and public port (P2: Y) of the second node B, where the (P2: Y) may be notified to the first node A by the relay node C1. Because the second node B has previously sent the UDP packet to the first node A, the NAT device N2 forwards the data packet to the second node B, so that the second node B can receive the UDP packet of the first node A.

In this case, the first node A and the second node B succeed in hole punching, and establish a direct connection for communication.

In an embodiment, when the NAT type of one of the first node and the second node is symmetric NAT and the NAT type of the other node is port restricted cone NAT, the first node and the second node may establish a connection in a "port-prediction direct connection" manner. The "port-prediction direct connection" manner needs to be implemented by using at least two relay nodes.

Figure 10:
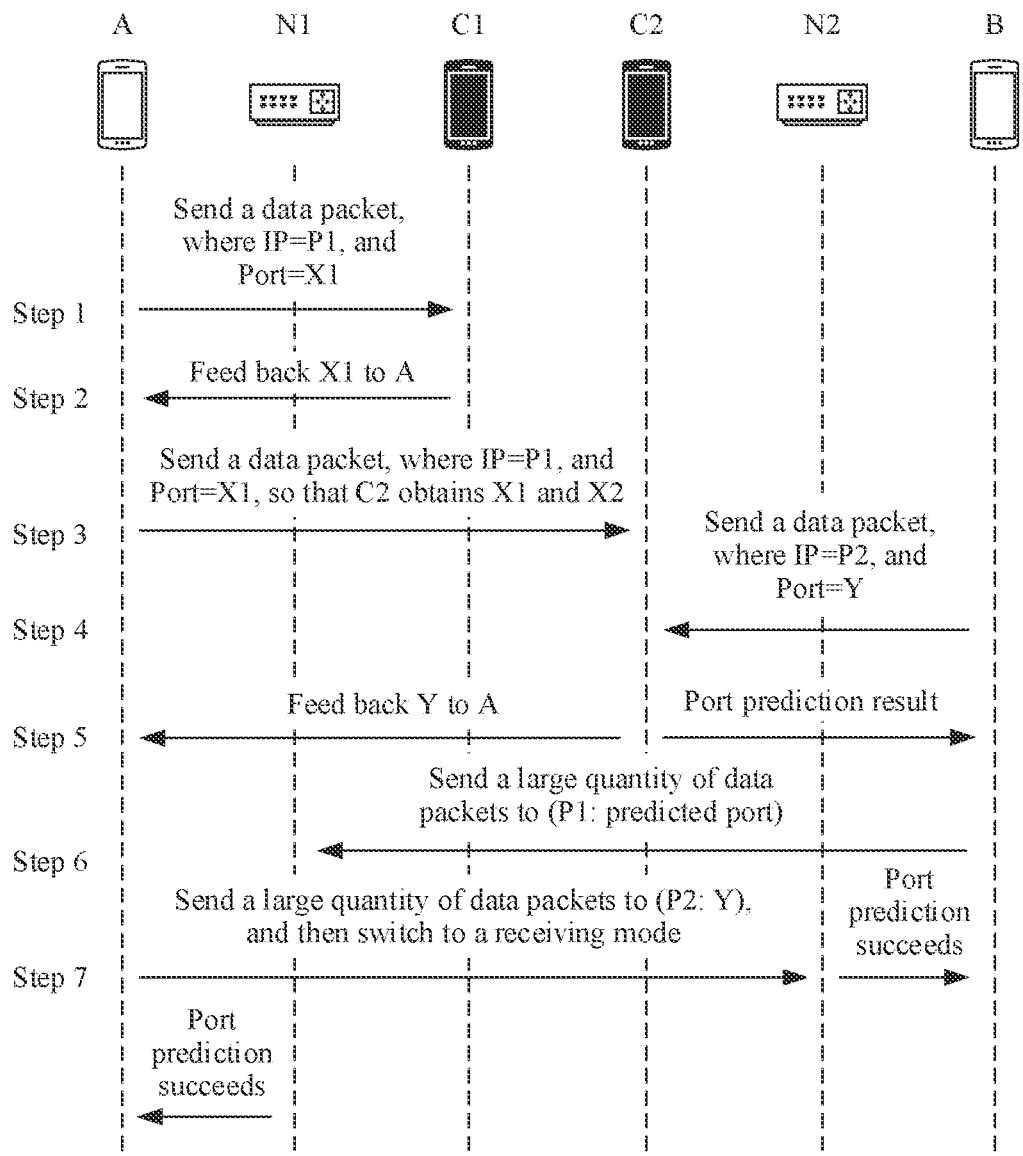
FIG. 10 is a schematic diagram of performing port-prediction direct connection by using relay nodes.

FIG. 10 is a schematic diagram of performing port-prediction direct connection by using relay nodes. As shown in FIG. 10, a first node A is located under a NAT device N1, and a second node B is located under a NAT device N2. The NAT device N1 has a public IP address P1, and the NAT device N2 has a public IP address P2. C1 and C2 are the relay nodes.

Further with reference to FIG. 10, when a NAT type of the first node A is symmetric NAT, and a NAT type of the second node B is port restricted cone NAT, the first node A and the second node B establish a direct connection by using "port-prediction direct connection", which may include the following steps:

Step 1: The first node A sends a data packet to the relay node C1, so that the relay node C1 obtains a public port X1 allocated by the NAT device N1 to the first node A.

Step 2: The relay node C1 feeds back the public port X1 to the first node A.

Step 3: The first node A sends a data packet to the relay node C2, where the data includes information such as the public port X1 fed back by the relay node C1, so that the relay node C2 obtains public ports X1 and X2 that are allocated by the NAT device N1 to the first node A at two times.

Step 4: The second node B sends a data packet to C2, so that the relay node C2 obtains a public port Y allocated by the NAT device N2 to the second node B.

Step 5: The relay node C2 predicts, based on the obtained public ports X1 and X2, a port allocated by the NAT device N1, sends a prediction result to the second node B, and feeds back the public port Y to the first node A, where the prediction result may include a plurality of predicted ports.

Step 6: The second node B sends a large quantity of data packets to the first node A by using the predicted port as a destination port.

Step 7: The first node A sends a large quantity of data packets to the second node B by using the port Y as a destination port, and then switches to a receiving mode.

If the predicted port hits a public port that is allocated by the NAT device N1 to the first node A in step 7, the second node B can receive the data packets sent by the first node A to the port Y, and the first node A can receive the data packets sent by the second node B to the hit port, in this case, the first node A and the second node B succeed in port prediction, and establish a direct connection for communication.

In an embodiment, if the NAT types of the first node and the second node are both symmetric NAT, the first node and the second node may establish communication through data forwarding by the relay node. This specifically includes the following: The first node and the second node separately establish connections to the relay node, all data that needs to be transmitted between the first node and the second node is sent to the relay node, and the relay node forwards the data to the peer nodes.

In an embodiment, the first node may perform a traceroute operation or a ping operation on each known super node, to obtain indicator information that can reflect link quality, such as route tracing information (a route hop count and a route path), communication time consumption, and/or a packet loss rate between the first node and each super node, and then select a super node with comparatively good link quality as the relay node based on at least one type of indicator information.

For example, a super node with lowest communication time consumption is selected as the relay node. Alternatively, when communication time consumption is close, a super node with a lowest packet loss rate is selected as the relay node. When the two types of indicator information, namely, communication time consumption and packet loss rates, are both close, a super node with a smallest route hop count is selected as the relay node.

In this way, it is ensured that low-latency and stable communication is formed between the relay node and the first node and the second node.

In an embodiment, if the first node once selected a relay node, the first node determines whether the selected relay node is included in the super node information; and if the selected relay node is included in the super node information, the first node determines the selected relay node as the relay node again.

In this way, the first node does not need to obtain link quality of each super node, so that a relay node selection speed is increased.

According to the method provided in this embodiment of this application, the first node obtains the super node information from the server, then obtains the NAT type of the first node by using the super node, and obtains the NAT type of the to-be-connected second node from the server; and then determines, based on the NAT type of the first node and the NAT type of the second node, whether to use the relay node, and selects, when the relay node needs to be used, the relay node from the super node to establish the connection to the second node. Therefore, according to the method, a terminal device in any network environment can establish a network connection and transmit data without using a server for data forwarding, so that there is no need to maintain a server for data forwarding. This avoids costs such as extra bandwidth required for server maintenance. In addition, because any terminal device whose NAT type meets a requirement may be used as a super node, a large quantity of super nodes may be distributed in the network system and perform a data relay function. In this way, super-node network resources are fully utilized, and network resource utilization is improved.

Figure 11:
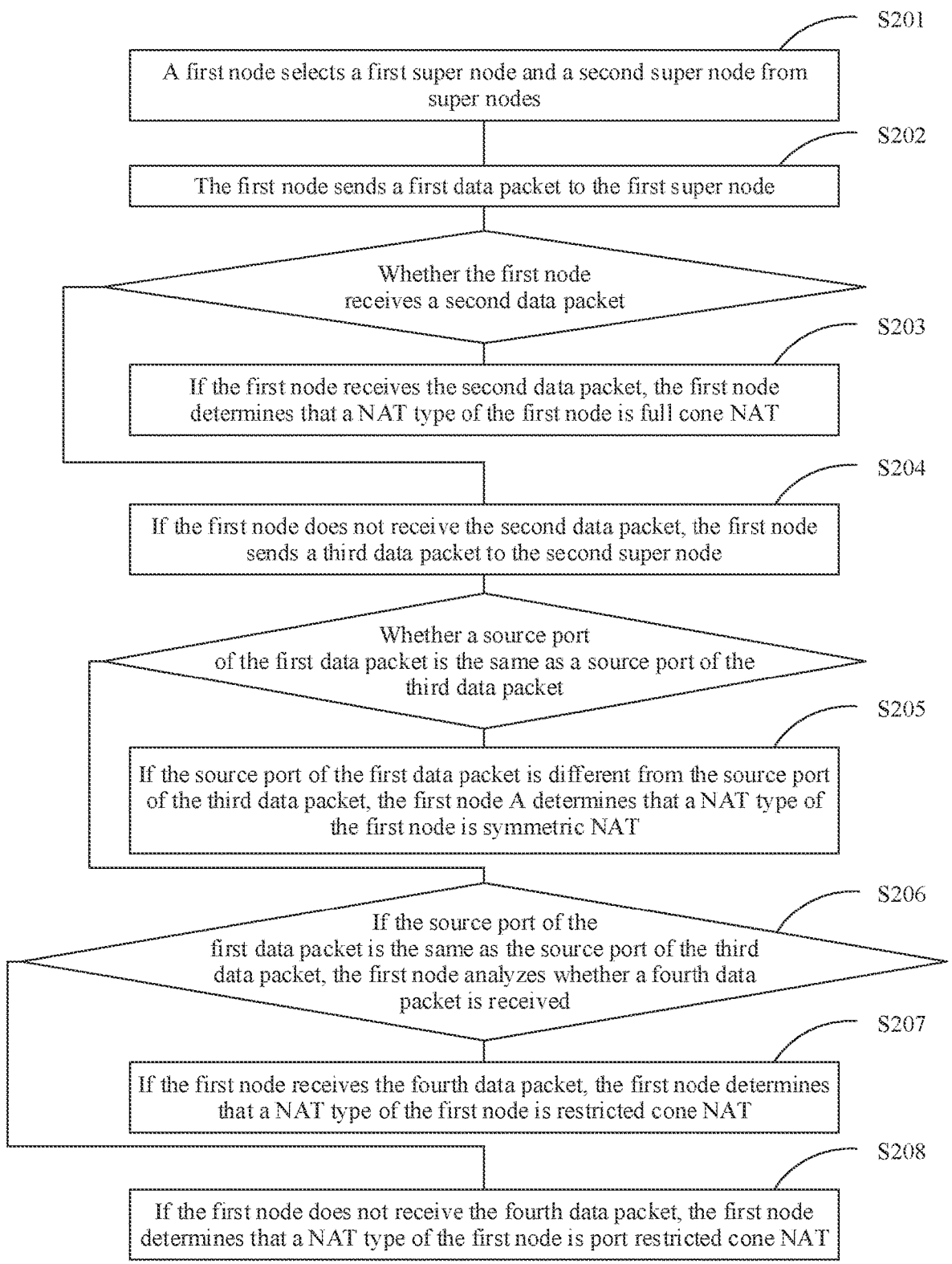
FIG. 11 is a flowchart of determining a NAT type of a first node by the first node.

FIG. 11 is a flowchart of determining the NAT type of the first node by the first node.

As shown in FIG. 11, in an embodiment, step S102, that is, the sending, by the first node, a data packet to the super node, and determining a NAT type of the first node based on a data packet returned by the super node, includes the following steps.

Step S201: The first node selects a first super node and a second super node from the super nodes.

In an embodiment, the first node may perform a traceroute operation or a ping operation on each known super node, to obtain indicator information that can reflect link quality, such as route tracing information (a route hop count and a route path), communication time consumption, and/or a packet loss rate between the first node and each super node, and then select two super nodes with comparatively good link quality as the first super node and the second super node based on at least one type of indicator information.

For example, two nodes with lowest communication time consumption are selected as the first super node and the second super node. Alternatively, when communication time consumption is close, two nodes with lowest packet loss rates are selected as the first super node and the second super node. When the two types of indicator information, namely, communication time consumption and packet loss rates, are both close, two nodes with smallest route hop counts are selected as the first super node and the second super node.

In this way, it is ensured that low-latency and stable communication is formed between the first node and the first super node and the second super node, and a speed and accuracy of determining the NAT type of the first node by the first node are increased.

In an embodiment, if the first node once used super nodes to obtain the NAT type of the first node, the first node determines whether the selected super nodes are included in the super node information; and if the selected super nodes are included in the super node information, the first node determines the selected super nodes as the first super node and the second super node again.

In this way, the first node can select the first super node and the second super node without obtaining link quality of each super node, thereby increasing a selection speed.

Figure 12:
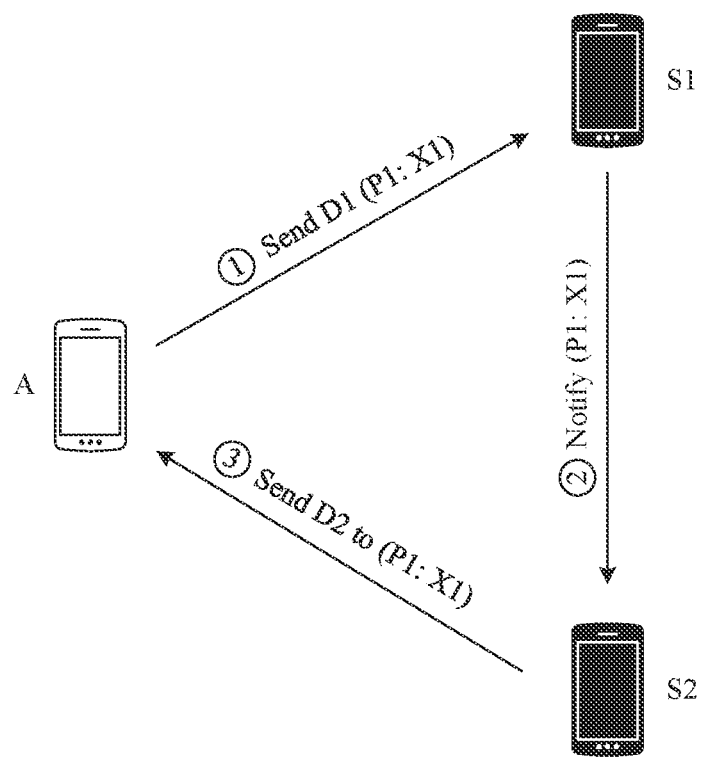
FIG. 12 is a schematic diagram of the first stage of determining a NAT type of a first node by the first node.

FIG. 12 is a schematic diagram of the first stage of determining the NAT type of the first node by the first node.

The first stage includes step S202 and step S203, so that whether the NAT type of the first node is full cone NAT can be determined.

Step S202: The first node sends a first data packet to the first super node.

As shown in FIG. 12, the first node A sends the first data packet D1 to the first super node S1. The first super node S1 receives the first data packet D1, and obtains a source IP address and source port (P1: X1) of the first data packet D1 through parsing. The (P1: X1) is a public IP address and public port that are allocated by a NAT device to the first node A. The first data packet D1 further includes an instruction. The instruction is used to instruct the first super node S1 to notify the (P1: X1) to the second super node S2 and instruct the second super node S2 to send a second data packet D2 to the (P1: X1).

Step S203: If the first node receives the second data packet, the first node determines that the NAT type of the first node is full cone NAT.

Full cone NAT does not restrict a data packet of an external host. Therefore, if the first node A can receive a data packet of the second super node S2 without previously sending any data packet to the second super node S2, it indicates that the NAT type of the first node A is full cone NAT.

In this way, by using the first super node and the second super node, the first node can determine, through one data packet sending and receiving action, whether the NAT type of the first node is full cone NAT.

Figure 13:
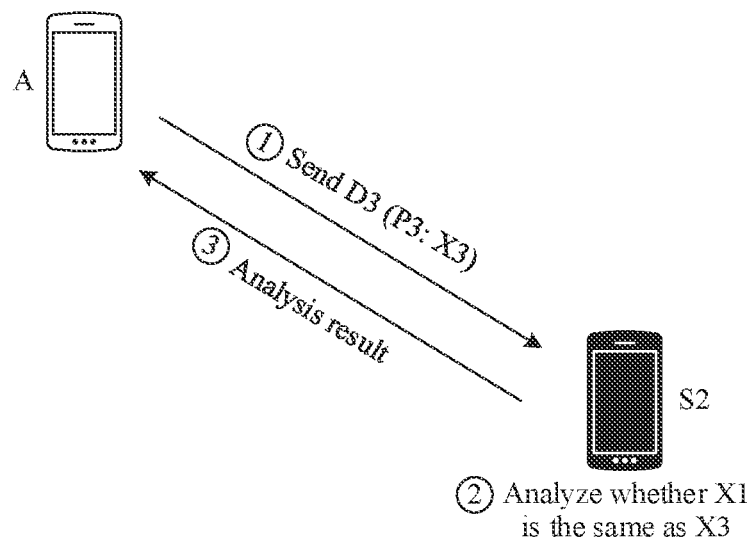
FIG. 13 is a schematic diagram of the second stage of determining a NAT type of a first node by the first node.

FIG. 13 is a schematic diagram of the second stage of determining the NAT type of the first node by the first node. The second stage includes step S204 and step S205, so that whether the NAT type of the first node is symmetric NAT can be determined.

Step S204: If the first node does not receive the second data packet, the first node sends a third data packet to the second super node.

In an embodiment, the first node may preset duration Tn. After sending the first data packet to the first super node at a moment Ts, the first node waits to receive the second data packet. If the first node still does not receive the second data packet when a moment Ts+Tn is reached, it may be considered that "the second data packet is not received".

As shown in FIG. 13, the first node A sends the third data packet D3 to the second super node S2. The second super node S2 receives the third data packet D3, and obtains a source IP address and source port (P3: X3) of the third data packet D3 through parsing. The (P3: X3) is a public IP address and public port that are allocated by the NAT device to the first node A. Then, the second super node S2 analyzes whether the source port X1 of the first data packet is the same as the source port X3 of the third data packet, and then sends an analysis result to the first node A by using the (P3: X3).

Step S205: If the source port of the first data packet is different from the source port of the third data packet, the first node determines that the NAT type of the first node is symmetric NAT.

In symmetric NAT, different public ports are allocated for connections that are initiated by an internal-network host to different external devices. Therefore, if the source port X1 is different from the source port X3, it indicates that the NAT type of the first node is symmetric NAT.

Figure 14:
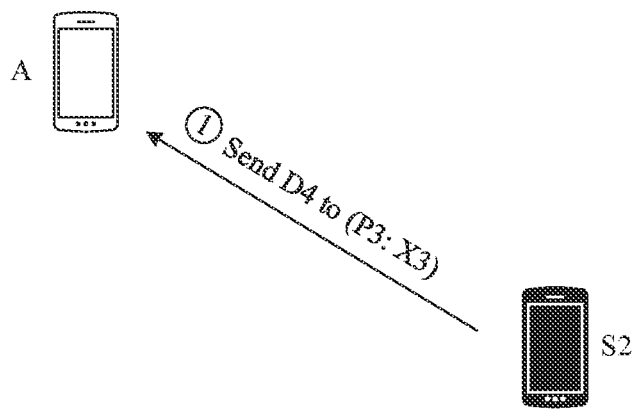
FIG. 14 is a schematic diagram of the third stage of determining a NAT type of a first node by the first node.

FIG. 14 is a schematic diagram of the third stage of determining the NAT type of the first node by the first node. The third stage includes step S206 to step S208, so that whether the NAT type of the first node is restricted cone NAT or port restricted cone NAT can be determined.

Step S206: If the source port of the first data packet is the same as the source port of the third data packet, the first node analyzes whether a fourth data packet is received.

The fourth data packet D4 is sent by the second super node S2 to the (P3: X3) when determining that the source port X1 is the same as the source port X3. A public port used by the second super node S2 to send the fourth data packet D4 is different from a destination port of the third data packet D3.

Step S207: If the first node receives the fourth data packet, the first node determines that the NAT type of the first node is restricted cone NAT.

Restricted cone NAT does not restrict a source port of a data packet sent by an external host. Therefore, if the first node A receives the fourth data packet D4, it indicates that the NAT type is restricted cone NAT.

Step S208: If the first node does not receive the fourth data packet, the first node determines that the NAT type of the first node is port restricted cone NAT.

In an embodiment, the first node may preset duration Tin After sending the third data, packet to the second super node at a moment Tr, the first node waits to receive the fourth data packet. If the first node still does not receive the fourth data packet when a moment Tm+Tr is reached, it may be considered that "the fourth data packet is not received".

Restricted cone NAT restricts a source port of a data packet sent by an external host. Therefore, if the first node A does not receive the fourth data packet D4, it indicates that the NAT type is port restricted cone NAT.

In this way, the first node can determine, by using the super node, the NAT type of the first node through a maximum of three stages of data packet receiving, data packet sending, and determining, to provide a basis for determining whether to use the relay node to establish the connection to the second node.

Figure 15:
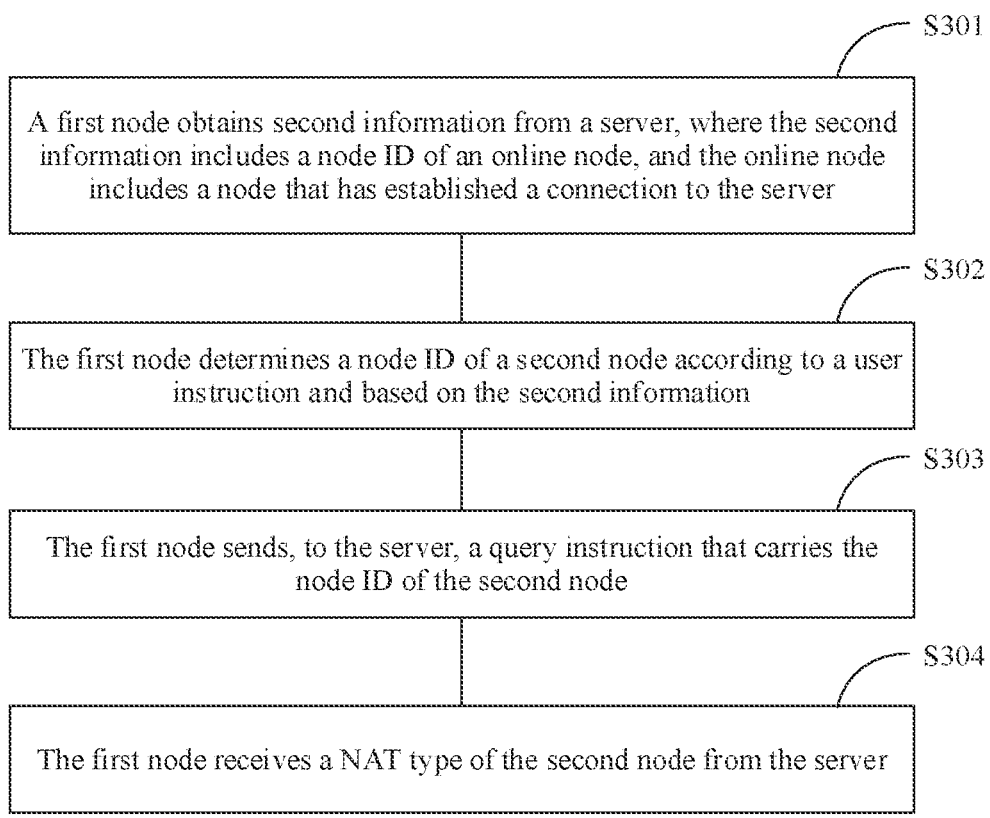
FIG. 15 is a flowchart of step S103 of a method for establishing an end-to-end network connection according to an embodiment of this application.

FIG. 15 is a flowchart of step S103 of the method for establishing an end-to-end network connection according to this embodiment of this application.

In an embodiment, as shown in FIG. 15, step S103, that is, the obtaining, by the first node, a NAT type of a to-be-connected second node from the server, includes the following steps.

Step S301: The first node obtains online node information from the server, where the online node information includes a node ID of an online node, and the online node includes a node that has established a connection to the server.

After logging in to the server, each node establishes a persistent connection to the server to remain in an online state. Therefore, the server can aggregate information about all connected nodes to obtain the online node information. In an embodiment, the online node information may be an online node list, and the online node list may include information such as the node ID of the online node, and a user name and a profile picture that are bound to the node. After logging in to the server, the first node may send a synchronization request to the server, so that the server sends the online node information to the first node. For example, the server may directly send the online node list to the first node. In addition, alternatively, the server may proactively send the online node information to the first node, so that the first node does not need to send a request to the server.

Step S302: The first node determines a node ID of the second node according to a user instruction and based on the online node information.

After obtaining the online node information, the first node may present the online node information to a user in a form of visual or voice information or the like, so that the user selects the second node by performing a visual operation, a voice operation, or the like.

For example, when the first node is a mobile terminal with a screen, a client program installed on the mobile terminal generates an operable interface for selecting the second node, and displays the interface on the screen. The operable interface can display information such as a user name and a profile picture that are bound to each online node. Therefore, the user holding the mobile terminal may select any online node as the second node in a manner such as touching or key pressing. After the user performs selection, the first node may determine the node ID of the second node.

Step S303: The first node sends, to the server, a query instruction that carries the node ID of the second node.

After receiving the query instruction, the server queries for the NAT type of the second node based on the node ID carried in the query instruction. Anode reports a NAT type of the node to the server after logging in to the server each time. Therefore, a NAT type, of each node, maintained by the server can be kept up to date, so that the NAT type, of the second node, obtained by the first node is also up to date.

Step S304: The first node receives the NAT type of the second node from the server.

In this way, the first node obtains the NAT type of the second node from the server, to provide a basis for determining whether to use the relay node to establish the connection to the second node.

Figure 16:
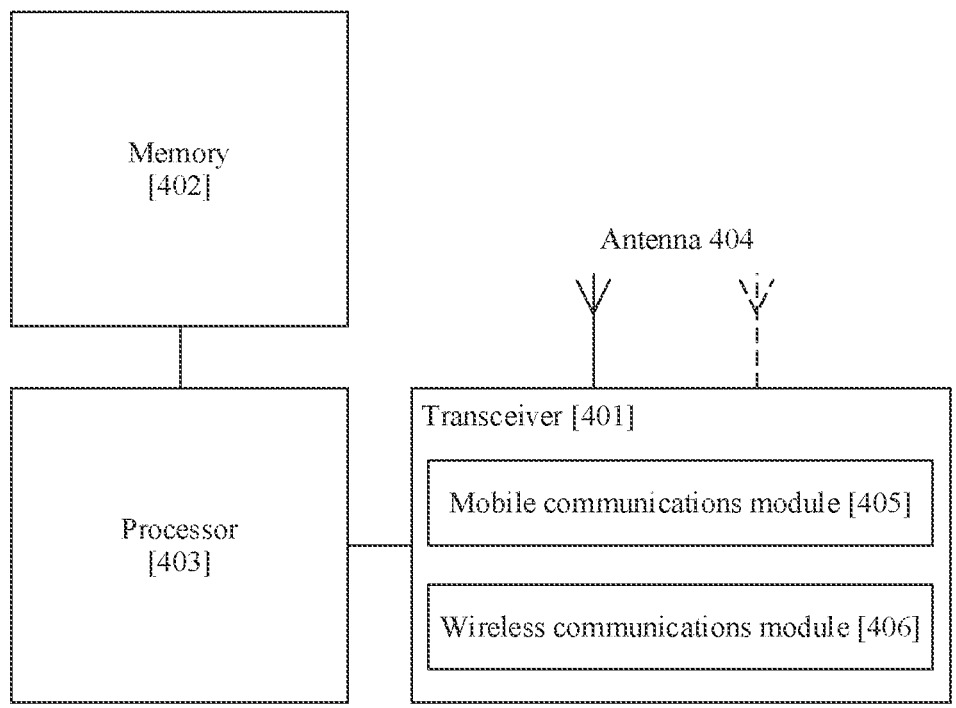
FIG. 16 is a schematic structural diagram of an apparatus for establishing an end-to-end network connection according to an embodiment of this application.

In the embodiments provided in the foregoing embodiments of this application, solutions of the method for establishing an end-to-end network connection provided in the embodiments of this application are described. It may be understood that, to implement the foregoing functions, the first node includes a corresponding hardware structure and/or software module for performing each function. A person of ordinary skill in the art should be easily aware that, in combination with units and algorithm steps in the examples described in the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application, FIG. 16 is a schematic structural diagram of an apparatus for establishing an end-to-end network connection according to an embodiment of this application. In an embodiment, the apparatus for establishing an end-to-end network connection is used as a first node, and implements corresponding functions by using a hardware apparatus structure shown in FIG. 16. As shown in FIG. 16, the apparatus for establishing an end-to-end network connection includes a transceiver 401, a memory 402, and a processor 403.

In an embodiment, the processor 403 may include one or more processing units. For example, the processor 403 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processor (neural-network processing unit, NPU). Different processing units may be independent components, or may be integrated into one or more processors.

The memory 402 is coupled to the processor 403, and is configured to store various software programs and/or a plurality of sets of instructions. In some embodiments, the memory 402 may include a high-speed random access memory, and may also include a non-volatile memory. The memory 402 may store an operating system, for example, an embedded operating system such as an Android system, an iOS system, a Windows system, or a Linux system.

In an embodiment, the transceiver 401 is a network interface controller (English: network interface controller, NIC), including a twisted pair interface (for example, RJ45) or an optical fiber interface, so that the apparatus can access a local area network LAN or wide area network WAN in a wired connection manner.

In an embodiment, the transceiver 401 includes an antenna 404 and a mobile communications module 405, so that the apparatus can access a cellular mobile network (cellular network). The antenna 404 is configured to transmit and receive electromagnetic wave signals. The mobile communications module 405 may provide wireless communication solutions, including a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access. TD-SCDMA), long term evolution (long term evolution, LTE), a 5th generation mobile communications technology (5th generation mobile networks new radio, 5G NR), and the like, on the apparatus. The mobile communications module 405 may include at least one filter, a switch, a power amplifier, a low noise amplifier (low noise amplifier, LNA), and the like. The MO bile communications module 405 may receive an electromagnetic wave by using the antenna 404, perform processing such as filtering and amplification on the received electromagnetic wave, and transmit the processed electromagnetic wave to the modem processor for demodulation. The mobile communications module 405 may further amplify a signal modulated by the modem processor, and convert the amplified signal to an electromagnetic wave for radiation by using the antenna 404. In some embodiments, at least some of functional modules of the mobile communications module 405 may be disposed in the processor 403. In some embodiments, at least some of functional modules of the mobile communications module 405 may be disposed in a same component as at least some of modules of the processor 403.

In an embodiment, the transceiver 401 includes an antenna 404 and a wireless communications module 406, so that the apparatus can access a wireless local area network (Wireless local area network, WLAN), for example, a wireless hotspot of Wi-Fi. The wireless communications module 406 receives an electromagnetic wave by using the antenna 404, performs frequency modulation and filtering processing on an electromagnetic wave signal, and sends the processed signal to the processor 403. The wireless communications module 406 may further receive a to-be-sent signal from the processor 403, perform frequency modulation and amplification on the signal, and convert the frequency-modulated and amplified signal to an electromagnetic wave for radiation by using the antenna 404.

When the software program and/or plurality of sets of instructions in the memory 402 are run by the processor 403, the apparatus is enabled to be configured to perform the following steps: obtaining super node information from a server, where a super node is a node that is determined by the server and whose network address translation (network address translation, NAT) type is cone NAT, or a node that has a public Internet protocol (internet protocol, IP) address; sending a data packet to the super node, and determining a NAT type of the apparatus based on a data packet returned by the super node; obtaining a NAT type of a to-be-connected second node from the server; determining, based on the NAT type of the apparatus and the NAT type of the second node, whether to use a relay node; and when determining to use the relay node, selecting a node from the super node as the relay node, and establishing a connection to the second node by using the relay node.

The apparatus provided in this embodiment of this application can obtain the super node information from the server; then obtain the NAT type of the apparatus by using the super node, and obtain the NAT type of the to-be-connected second node from the server; and then determine, based on the NAT type of the apparatus and the NAT type of the second node, whether to use the relay node, and select, when the relay node needs to be used, the relay node from the super node to establish the connection to the second node. Therefore, according to the method, a terminal device in any network environment can establish a network connection and transmit data without using a server for data forwarding, so that there is no need to maintain a server for data forwarding. This avoids costs such as extra bandwidth required for server maintenance. In addition, because any terminal device whose NAT type meets a requirement may be used as a super node, a large quantity of super nodes may be distributed in a network system and perform a data relay function. In this way, super-node network resources are fully utilized, and network resource utilization is improved.

In an embodiment, when the software program and/or plurality of sets of instructions in the memory 402 are run by the processor 403, the apparatus is further enabled to be configured to perform the following steps, to implement the sending a data packet to the super node, and determining a NAT type of the apparatus based on a data packet returned by the super node: sending data packets to at least two super nodes, and determining the NAT type of the apparatus based on whether a data packet returned by the super node is received and a parameter of the data packet returned by the super node. In this way, the first node can determine the NAT type of the first node without relying on the server, to provide a basis for determining whether to use the relay node for connecting to the second node.

In an embodiment, when the software program and/or plurality of sets of instructions in the memory 402 are run by the processor 403, the apparatus is further enabled to be configured to perform the following steps, to implement the sending a data packet to the super node, and determining a NAT type of the apparatus based on a data packet returned by the super node: selecting a first super node and a second super node from the super nodes; sending a first data packet to the first super node, so that the first super node obtains a source IP address and source port of the first data packet; and indicates the second super node to send a second data packet to the source IT address and source port of the first data packet and if the second data packet is received, determining that the NAT type of the apparatus is full cone NAT. In this way, by using the first super node and the second super node, the first node can determine whether the NAT type of the first node is full cone NAT.

In an embodiment, when the software program and/or plurality of sets of instructions in the memory 402 are run by the processor 403, the apparatus is further enabled to be configured to perform the following steps: if the second data packet is not received, sending a third data packet to the second super node, so that the second super node obtains a source IP address and source port of the third data packet, and analyzes whether the source port of the first data packet is the same as the source port of the third data packet; and if the source port of the first data packet is different from the source port of the third data packet, determining that the NAT type of the apparatus is symmetric NAT. In this way, when determining that the NAT type of the first node is not symmetric NAT, the apparatus can further determine, by using the second super node, whether the NAT type of the first node is restricted cone NAT or port restricted cone NAT.

In an embodiment, when the software program and/or plurality of sets of instructions in the memory 402 are run by the processor 403, the apparatus is further enabled to be configured to perform the following steps: if the source port of the first data packet is the same as the source port of the third data packet, analyzing whether a fourth data packet is received, where the fourth data packet is sent by the second super node to the source IP address and source port of the third data packet, and a public port used by the second super node to send the fourth data packet is different from a destination port of the third data packet; and if the fourth data packet is received, determining that the NAT type of the apparatus is restricted cone NAT; or if the fourth data packet is not received, determining that the NAT type of the apparatus is port restricted cone NAT. In this way, when determining that the NAT type of the first node is not full cone NAT or symmetric NAT, the apparatus can further determine, by using the second super node, whether the NAT type of the first node is restricted cone NAT or port restricted cone NAT.

In an embodiment, when the software program and/or plurality of sets of instructions in the memory 402 are run by the processor 403, the apparatus is further enabled to be configured to perform the following steps, to implement the selecting a first super node and a second super node from the super nodes: obtaining link quality of each super node, and selecting the first super node and the second super node based on the link quality. In this way, the apparatus can select the first super node and the second super node without obtaining link quality of each super node, thereby increasing a selection speed.

In an embodiment, when the software program and/or plurality of sets of instructions in the memory 402 are run by the processor 403, the apparatus is further enabled to be configured to perform the following steps, to implement the selecting a first super node and a second super node from the super nodes: determining whether the super node information includes historically selected super nodes, and if the super node information includes the historically selected super nodes, selecting the first super node and the second super node from the historically selected super nodes. In this way, the apparatus can select the first super node and the second super node without obtaining link quality of each super node, thereby increasing a selection speed.

In an embodiment, when the software program and/or plurality of sets of instructions in the memory 402 are run by the processor 403, the apparatus is further enabled to be configured to perform the following steps, to implement the obtaining a NAT type of a to-be-connected second node from the server: obtaining online node information from the server; determining a node identity (identity document, ID) of the second node from the online node information according to a user instruction; sending, to the server, a query instruction that carries the node ID of the second node; and receiving the NAT type that is of the second node and that is obtained by the server through querying based on the node ID of the second node. In this way, the apparatus determines the second node according to the user instruction, and obtains the NAT type of the second node from the server, to provide a basis for determining whether the first node uses the relay node to establish the connection to the second node.

In an embodiment, when the software program and/or plurality of sets of instructions in the memory 402 are run by the processor 403, the apparatus is further enabled to be configured to perform the following step, to implement the determining, based on the NAT type of the apparatus and the NAT type of the second node, whether to use a relay node: when the NAT types/type of the apparatus and/or the second node are/is full cone NAT, or when the apparatus and/or the second node have/has public IP addresses/a public IP address, determining that the relay node does not need to be used. Therefore, by using a characteristic that a node with full cone NAT and a node having a public IP address can be accessed by any node, when the NAT type of either of the first node and the second node is full cone NAT or either of the first node and the second node has a public IP address, the first node can be directly connected to the second node, so that no relay node needs to be used.

In an embodiment, when the software program and/or plurality of sets of instructions in the memory 402 are run by the processor 403, the apparatus is further enabled to be configured to perform the following step, to implement the determining, based on the NAT type of the apparatus and the NAT type of the second node, whether to use a relay node: when the NAT types of the apparatus and the second node are restricted cone NAT or port restricted cone NAT, or when the NAT type of one of the apparatus and the second node is symmetric NAT and the NAT type of the other one is restricted cone NAT, determining to use the relay node, where the relay node is used by the apparatus and the second node to perform UDP (user datagram protocol, user datagram protocol) hole punching (holepunch).

In an embodiment, when the software program and/or plurality of sets of instructions in the memory 402 are run by the processor 403, the apparatus is further enabled to be configured to perform the following step, to implement the determining, based on the NAT type of the apparatus and the NAT type of the second node, whether to use a relay node: when the NAT type of one of the apparatus and the second node is symmetric NAT and the NAT type of the other one is port restricted cone NAT, determining to use the relay node, where the relay node is used by the apparatus and the second node to perform port prediction.

In an embodiment, when the software program and/or plurality of sets of instructions in the memory 402 are run by the processor 403, the apparatus is further enabled to be configured to perform the following step, to implement the determining, based on the NAT type of the apparatus and the NAT type of the second node, whether to use a relay node: when the NAT types of the apparatus and the second node are both symmetric NAT, determining to use the relay node, where the relay node is used for data forwarding between the apparatus and the second node. Because the relay node can be selected from the super node, in this embodiment of this application, there is no need to maintain a server for data forwarding. This avoids costs such as extra bandwidth required for server maintenance. In addition, because any terminal device whose NAT type meets a requirement may be used as a super node, a large quantity of super nodes may be distributed in a network system, and perform a data relay function by using bandwidth resources of the super nodes. This helps to fully utilize a network resource of each node, and improve network resource utilization.

In an embodiment, when the software program and/or plurality of sets of instructions in the memory 402 are run by the processor 403, the apparatus is further enabled to be configured to perform the following steps, to implement the selecting a node from the super node as the relay node: obtaining link quality of each super node, and selecting the relay node from the super node based on the link quality. In this way, it is ensured that low-latency and stable communication is formed between the relay node and the first node and the second node through data forwarding by, the relay node.

Figure 17:
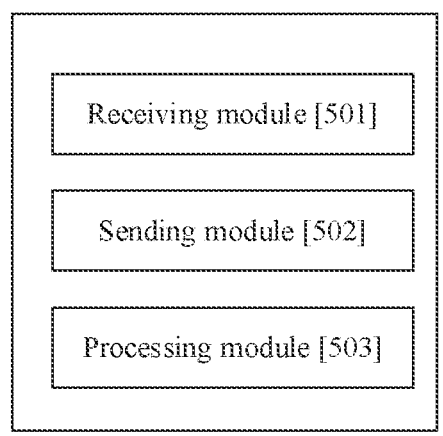
FIG. 17 is a schematic structural diagram of another apparatus for establishing an end-to-end network connection according to an embodiment of this application.

FIG. 17 is a schematic structural diagram of another apparatus for establishing an end-to-end network connection according to an embodiment of this application. In an embodiment, the first node implements corresponding functions by using software modules shown in FIG. 17. The apparatus for establishing an end-to-end network connection includes: a receiving module 501, configured to obtain super node information from a server, where a super node is a node that is determined by the server and whose NAT type is cone NAT, or a node that has a public IP address; a sending module 502, configured to send a data packet to the super node, where the receiving module 501 is further configured to receive a data packet returned by the super node; and a processing module 503, configured to determine a NAT type of the first node based on the data packet returned by the super node. The receiving module 501 is further configured to obtain a NAT type of a to-be-connected second node from the server. The processing module 503 is further configured to determine, based on the NAT type of the first node and the NAT type of the second node, whether to use a relay node. The processing module 503 is further configured to: when determining to use the relay node, select a node from the super node as the relay node, so that the first node establishes a connection to the second node by using the relay node.

The apparatus provided in this embodiment of this application can obtain the super node information from the server; then obtain the NAT type of the apparatus by using the super node, and obtain the NAT type of the to-be-connected second node from the server; and then determine, based on the NAT type of the apparatus and the NAT type of the second node, whether to use the relay node, and select, when the relay node needs to be used, the relay node from the super node to establish the connection to the second node. Therefore, according to the method, a terminal device in any network environment can establish a network connection and transmit data without using a server for data forwarding, so that there is no need to maintain a server for data forwarding. This avoids costs such as extra bandwidth required for server maintenance. In addition, because any terminal device whose NAT type meets a requirement may be used as a super node, a large quantity of super nodes may be distributed in a network system and perform a data relay function. In this way, super-node network resources are fully utilized, and network resource utilization is improved.

Figure 18:
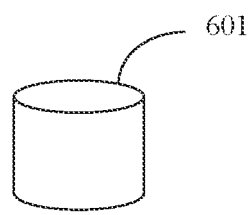
FIG. 18 is a schematic diagram of a computer readable storage medium according to an embodiment of this application.

As shown in FIG. 18, an embodiment of this application further provides a computer readable storage medium 601. The computer readable storage medium 601 stores instructions. When the instructions are run on a computer, the computer is enabled to perform the method according to the foregoing aspects.

An embodiment of this application further provides a computer program product that includes instructions. When the computer program product is run on a computer, the computer is enabled to perform the method according to the foregoing aspects.

Figure 19:
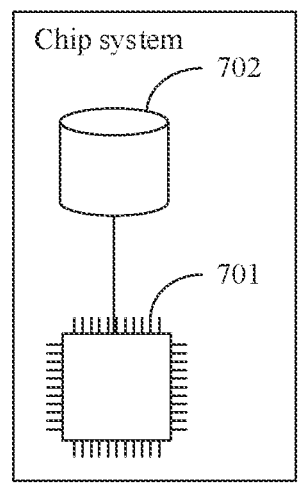
FIG. 19 is a schematic structural diagram of a chip system according to an embodiment of this application.

An embodiment of this application further provides a chip system. FIG. 19 is a schematic structural diagram of the chip system. The chip system includes a processor 701, configured to support the foregoing apparatus in implementing a function in the foregoing aspects, for example, generating or processing information in the foregoing method. In a possible design, the chip system further includes a memory 702, configured to store program instructions and data that are necessary for an apparatus for establishing an end-to-end network connection. The chip system may include a chip, or may include a chip and another discrete device.

In the foregoing specific implementations, the objectives, technical solutions, and benefits of the embodiments of this application are further described in detail. It should be understood that the foregoing descriptions are merely specific implementations of the embodiments of this application, but are not intended to limit the protection scope of the embodiments of this application. Any modification, equivalent replacement, improvement, or the like made based on the technical solutions in the embodiments of this application shall fall within the protection scope of the embodiments of this application.

What is claimed is:

1. A method implemented by a first node, wherein the method comprises:
 obtaining, from a server, super node information of super nodes;
 sending, to the super nodes, a first data packet;
 receiving, from the super nodes in response to the first data packet, a second data packet;
 determining a first network address translation (NAT) type of the first node based on the second data packet;
 obtaining, from the server, a second NAT type of a second node;
 determining, based on the first NAT type and the second NAT type, whether to use a relay node from the super nodes;
 selecting, in response to determining to use the relay node, a super node from the super nodes as the relay node;
 establishing a connection to the second node using the relay node;
 selecting a first super node and a second super node from the super nodes;
 sending a third data packet to the first super node to enable the first super node to obtain a first source Internet Protocol (IP) address of the third data packet and a first source port of the third data packet and to instruct the second super node to send a fourth data packet to the first source IP address and the first source port; and
 determining that the first NAT type is a full cone NAT when the first node receives the fourth data packet.

2. The method of claim 1, further comprising:
 sending, to at least two super nodes, data packets; and
 determining the first NAT type based on a fifth data packet received from the at least two super nodes and a parameter of the fifth data packet.

3. The method of claim 1, further comprising:
 sending a fifth data packet to the second super node when the first node does not receive the fourth data packet, wherein the fifth data packet enables the second super node to obtain a second source IP address of the fifth data packet and a second source port of the fifth data packet and to analyze whether the first source port is the same as the second source port; and
 determining that the first NAT type is a symmetric NAT when the first source port is different from the second source port.

4. The method of claim 3, further comprising:
 determining whether a sixth data packet is received when the first source port is the same as the second source port, wherein the sixth data packet is from the second super node to the second source IP address and the second source port using a public port that is different from a destination port of the fifth data packet;
 determining that the first NAT type is a restricted cone NAT when the first node receives the sixth data packet; and
 determining that the first NAT type is a port restricted cone NAT when the first node does not receive the sixth data packet.

5. The method of claim 1, further comprising:
 determining whether the super node information comprises historically selected super nodes; and
 selecting, based on determining that the super node information comprises the historically selected super nodes, the first super node and the second super node from the historically selected super nodes.

6. The method of claim 1, further comprising:
 obtaining online node information from the server;
 determining a node identity (ID) of the second node from the online node information according to a user instruction;
 sending, to the server, a query instruction carrying the node ID; and
 receiving, from the server based on the query instruction, the second NAT type.

7. The method of claim 1, further comprising determining to use the relay node either when the first NAT type and the second NAT type are a restricted cone NAT or a port restricted cone NAT or when one of the first NAT type or the second NAT type is a symmetric NAT and the other is the restricted cone NAT, wherein the relay node is used by the first node and the second node to perform User Datagram Protocol (UDP) hole punching.

8. The method of claim 1, further comprising performing instant messaging (IM) with the second node using the relay node, wherein the instant messaging comprises at least one of a voice communication, a video communication, an image transmission, a text transmission or a file transmission.

9. A first node comprising:
 a memory configured to store program instructions; and
 a processor coupled to the memory, wherein when executed by the processor, the program instructions cause the first node to:
  obtain, from a server, super node information of super nodes;
  send a first data packet to the super nodes;
  receive, from the super nodes in response to the first data packet, a second data packet;
  determine a first network address translation (NAT) type of the first node based on the second data packet;

obtain, from the server, a second NAT type of a second node;

determine, based on the first NAT type and the second NAT type, whether to use a relay node from the super nodes;

select, in response to determining to use the relay node, a super node from the super nodes as the relay node;

establish a connection to the second node using the relay node;

select a first super node and a second super node from the super nodes;

send a third data packet to the first super node to enable the first super node to obtain a first source Internet Protocol (IP) address of the third data packet and a first source port of the first data packet and to instruct the second super node to send a fourth data packet to the first source IP address and the first source port; and determine that the first NAT type is a full cone NAT when the first node receives the fourth data packet.

10. The first node of claim 9, wherein when executed by the processor, the program instructions further cause the first node to:

send data packets to at least two super nodes; and determine the first NAT type based on a fifth data packet received from the at least two super nodes and a parameter of the fifth data packet.

11. The first node of claim 9, wherein when executed by the processor, the program instructions further cause the first node to:

send a fifth data packet to the second super node when the first node does not receive the fourth data packet, wherein the fifth data packet enables the second super node to obtain a second source IP address of the fifth data packet and a second source port of the fifth data packet and to analyze whether the first source port is the same as the second source port; and determine that the second NAT type is a symmetric NAT when the first source port is different from the second source port.

12. The first node of claim 11, wherein when executed by the processor, the program instructions further cause the first node to:

determine whether a sixth data packet is received when the first source port is the same as the second source port, wherein the sixth data packet is from the second super node to the second source IP address and the second source port using a public port that is different from a destination port of the fifth data packet; and determine that the first NAT type is a restricted cone NAT when the first node receives the sixth data packet; and determine that the first NAT type is a port restricted cone NAT when the first node does not receive the sixth data packet.

13. The first node of claim 9, wherein when executed by the processor, the program instructions further cause the first node to:

determine whether the super node information comprises historically selected super nodes; and select, in response to determining that the super node information comprises the historically selected super nodes, the first super node and the second super node from the historically selected super nodes.

14. The first node of claim 9, wherein when executed by the processor, the program instructions further cause the first node to:

obtain online node information from the server;

determine a node identity (ID) of the second node from the online node information according to a user instruction;

send, to the server, a query instruction carrying the node ID; and receive, from the server based on the query instruction, the second NAT type.

15. The first node of claim 9, wherein when executed by the processor, the program instructions further cause the first node to determine to use the relay node either when the first NAT type and the second NAT type are a restricted cone NAT or a port restricted cone NAT or when one of the first NAT type or the second NAT type is a symmetric NAT and the other is the restricted cone NAT, wherein the relay node is used by the first node and the second node to perform User Datagram Protocol (UDP) hole punching.

16. The first node of claim 9, wherein when executed by the processor, the program instructions further cause the first node to determine to use the relay node when the first NAT type and the second NAT type are both a symmetric NAT, and wherein the relay node is used for data forwarding between the first node and the second node.

17. A network system comprising:

a server configured to send super node information of super nodes; and a first node coupled to the server and configured to:

receive the super node information;

send, responsive to receiving the super node information, a first data packet to the super nodes;

receive, from the super nodes in response to the first data packet, a second data packet;

determine a first network address translation (NAT) type of the first node based on the second data packet; and send a request to the server, wherein the server is further configured to send, in response to the request, a second NAT type of a second node of the network system to the first node, wherein the second node is a to-be-connected node selected by the first node, and wherein the first node is further configured to:

make a determination, based on the first NAT type and the second NAT type, to use a relay node from the super nodes;

select, in response to the determination, a super node from the super nodes as the relay node;

establish a connection to the second node using the relay node;

select a first super node and a second super node from the super nodes;

send a third data packet to the first super node to enable the first super node to obtain a first source Internet Protocol (IP) address of the third data packet and a first source port of the first data packet and to instruct the second super node to send a fourth data packet to the first source IP address and the first source port; and determine that the first NAT type is a full cone NAT when the first node receives the fourth data packet.

18. The network system of claim 17, wherein the first node is configured to send data packets to at least two super nodes of the network system, wherein the at least two super nodes are configured to return a fifth data packet to the first node in response to the data packets, and wherein the first node is further configured to determine the first NAT type based on the fifth data packet received from the at least two super nodes and a parameter of the fifth data packet.

19. The network system of claim 17, wherein the first node is further configured to perform instant messaging (IM) with the second node using the relay node, and wherein the instant messaging comprises at least one of a voice communication, a video communication, an image transmission, or a text transmission.

20. The network system of claim 17, wherein the first node is further configured to perform instant messaging (IM) with the second node using the relay node, and wherein the instant messaging comprises a file transmission.

* * * * *